(12) United States Patent
Hayakawa

(10) Patent No.: US 10,173,670 B2
(45) Date of Patent: Jan. 8, 2019

(54) PARKING ASSISTANCE DEVICE

(71) Applicant: AISIN SEIKI KABUSHIKI KAISHA, Kariya-shi, Aichi-ken (JP)

(72) Inventor: Kazutaka Hayakawa, Anjo (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 74 days.

(21) Appl. No.: 15/421,494

(22) Filed: Feb. 1, 2017

(65) Prior Publication Data

US 2017/0253236 A1    Sep. 7, 2017

(30) Foreign Application Priority Data

Mar. 4, 2016  (JP) .................................. 2016-042443

(51) Int. Cl.
| | |
|---|---|
| *G06K 9/00* | (2006.01) |
| *B60W 30/06* | (2006.01) |
| *G08G 1/14* | (2006.01) |
| *G08G 1/16* | (2006.01) |

(52) U.S. Cl.
CPC ......... *B60W 30/06* (2013.01); *G06K 9/00805* (2013.01); *G06K 9/00812* (2013.01); *G08G 1/14* (2013.01); *G08G 1/168* (2013.01); *B60W 2550/10* (2013.01); *B60W 2710/10* (2013.01); *B60W 2710/18* (2013.01); *B60W 2710/20* (2013.01)

(58) Field of Classification Search
CPC ......... B60W 2550/10; B60W 2710/10; B60W 2710/18; B60W 2710/20; B60W 30/06; G06K 9/00805; G08G 1/14; G08G 1/168
See application file for complete search history.

(56) References Cited

U.S. PATENT DOCUMENTS

| | | | |
|---|---|---|---|
| 8,779,939 B2 | 7/2014 | Barth et al. | |
| 2010/0321211 A1* | 12/2010 | Ko | G08G 1/163 340/932.2 |
| 2012/0194355 A1* | 8/2012 | Thomas | B60R 1/00 340/932.2 |

(Continued)

FOREIGN PATENT DOCUMENTS

| | | |
|---|---|---|
| JP | 2010-267115 A | 11/2010 |
| JP | 5469663 B2 | 4/2014 |

*Primary Examiner* — Tom Y Lu
(74) *Attorney, Agent, or Firm* — Sughrue Mion, PLLC

(57) ABSTRACT

A parking assistance device includes: a parking space candidate detection unit estimating positions of obstacles based on data of distance to the obstacles at both sides of a host vehicle, and detecting a parking space candidate at the sides of the vehicle; an image selection unit selecting two or more captured images in which an inner side surface of an obstacle adjacent to the parking space candidate is captured; a stereo image processing unit performing stereo image processing on the two or more captured images and calculating a three-dimensional point group of the obstacle; a position determination unit determining a position of the obstacle on the parking space candidate side based on the calculated three-dimensional point group; and a parking space correction unit correcting a position of the parking space candidate based on the determined position of the obstacle on the parking space candidate side.

7 Claims, 15 Drawing Sheets

(56) References Cited

U.S. PATENT DOCUMENTS

2013/0096816 A1* 4/2013 Takano .............. B62D 15/0265
701/400
2013/0166190 A1* 6/2013 Ikeda ................. B62D 15/0285
701/400

* cited by examiner

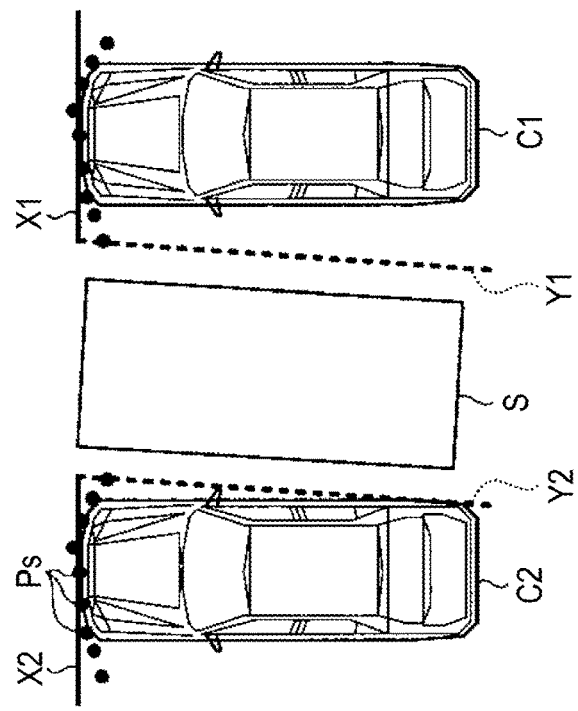
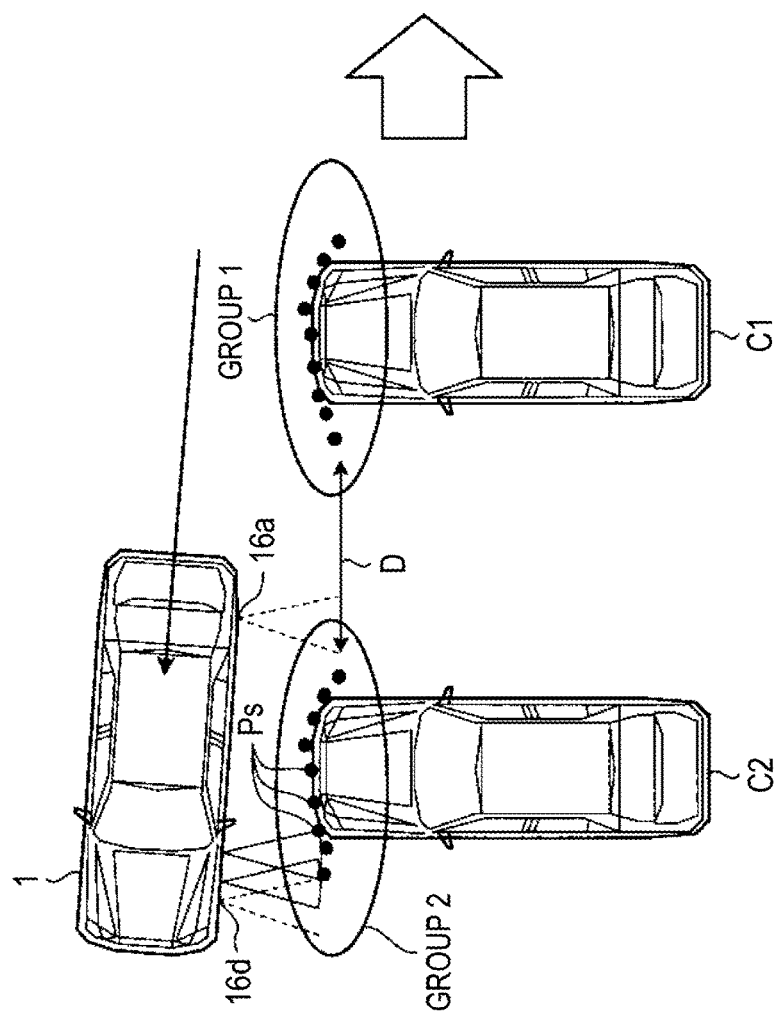

VIRTUAL SURFACE VS

VIRTUAL SURFACE VS

FIG.14A
FIG.14B
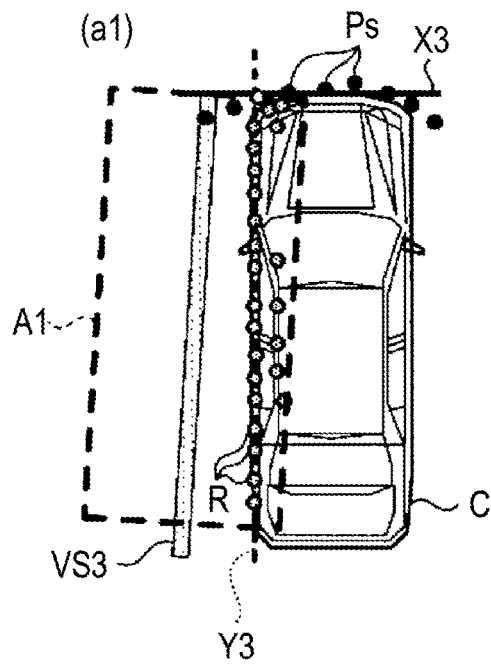
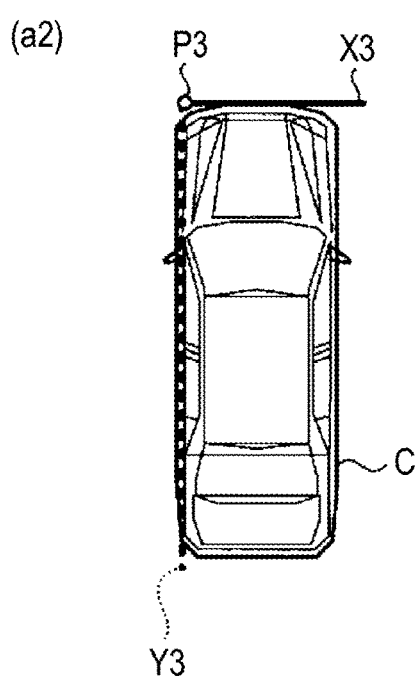
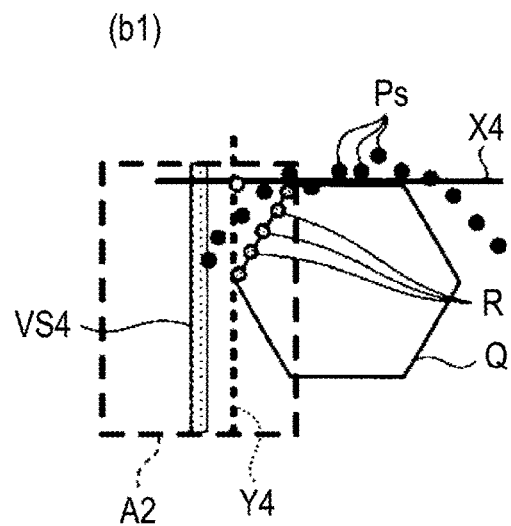
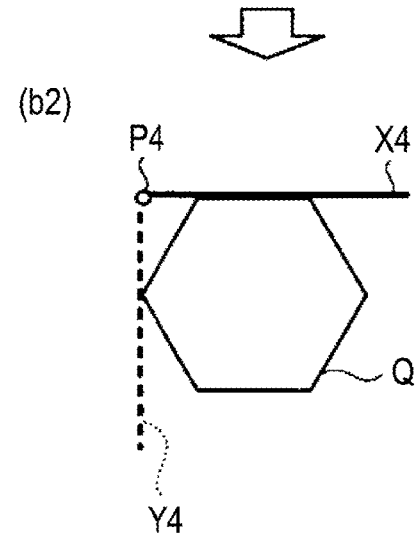

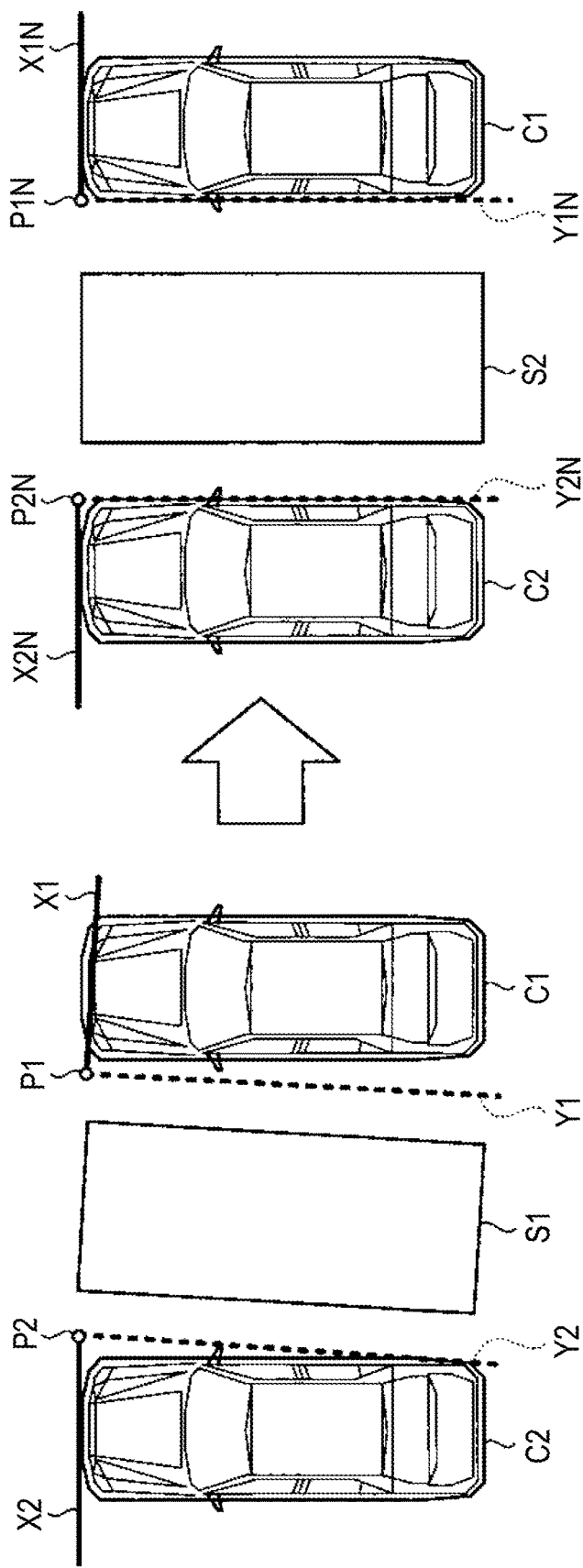

US 10,173,670 B2

PARKING ASSISTANCE DEVICE

CROSS REFERENCE TO RELATED APPLICATIONS

This application is based on and claims priority under 35 U.S.C. § 119 to Japanese Patent Application 2016-042443, filed on Mar. 4, 2016, the entire contents of which are incorporated herein by reference.

TECHNICAL FIELD

An embodiment in this disclosure relates to a parking assistance device.

BACKGROUND DISCUSSION

A parking assistance device that is mounted on a vehicle in order for a parking assistance is known. The parking assistance device, for example, detects an obstacle such as another parked vehicle and determines a route to a target parking position while avoiding the obstacle. The parking assistance device assists the parking based on the route.

In a case of determining the route, for example, there is a method (hereinafter, referred to as a "method 1 in the related art") in which shapes of the obstacles at both sides of the target parking position are continuously detected even during the parking assistance and the route is changed, if necessary. According to this method, it is possible to improve accuracy of the route.

In addition, there is also a method (hereinafter, referred to as a "method 2 in the related art") in which a side surface of the obstacle in the target parking position side (hereinafter, referred to as an "inner side surface") is detected using ultrasonic sonar, and further, a position of the inner side surface of the obstacle is determined using an image in which the inner side surface is in the vicinity of the center among the images that include the inner side surfaces continuously captured by a camera. According to this method, it is possible to determine the target parking position with high accuracy before the parking assistance.

Japanese Patent No. 5469663 and JP 2010-267115A are examples of the related arts.

However, in the method 1 in the related art, the route is changed even after the vehicle enters the target parking position during the parking assistance. Therefore, there is a problem in that a correct target parking position is delayed to be recognized, and thus, it takes a time in parking the vehicle due to the forward and backward turnings.

In addition, in the method 2 in the related art, in some cases, there is no image in which the inner side surface is captured in the vicinity of the center depending on a sampling rate of imaging or a speed of the host vehicle, and thus, there is a problem in that an error of the target parking position increases.

SUMMARY

Thus, a need exists for a parking assistance device which is not suspectable to the drawback mentioned above.

A parking assistance device according to an embodiment is a parking assistance device that performs a parking assistance. The parking assistance device includes: a parking space candidate detection unit that estimates a position of each of obstacles based on data of distance to the obstacles at both sides of a host vehicle when the host vehicle on which the parking assistance device is mounted is traveling, and detects a parking space candidate at the sides of the host vehicle; an image selection unit that selects two or more captured images in which an inner side surface of an adjacent obstacle adjacent to the parking space candidate on the side of the parking space candidate is captured among images captured by an imaging unit provided on the host vehicle, in which the surroundings of the host vehicle are imaged, when the parking space candidate is detected; a stereo image processing unit that performs stereo image processing on the selected two or more captured images and calculates a three-dimensional point group of the obstacle; a position determination unit that determines a position of the obstacle on the parking space candidate side based on the calculated three-dimensional point group; and a parking space correction unit that corrects a position of the parking space candidate based on the determined position of the obstacle on the parking space candidate side. According to this configuration, for example, the stereo image processing is performed on two or more captured images in which the inner side surface of the obstacle adjacent to the parking space candidate is captured, and the three-dimensional point group is calculated. Therefore, it is possible to quickly determine the position of the parking space candidate (target parking position) with high accuracy.

BRIEF DESCRIPTION OF THE DRAWINGS

The foregoing and additional features and characteristics of this disclosure will become more apparent from the following detailed description considered with the reference to the accompanying drawings, wherein:

FIGS. 8A and 8B are diagrams describing the processing in FIG. 7;

FIGS. 14A and 14B are diagrams describing the processing in FIG. 13;

FIGS. 15A and 15B are diagrams describing processing for correcting a position of the parking space candidate.

DETAILED DESCRIPTION

Hereinafter, an example of an embodiment of this disclosure will be disclosed. Configurations in the embodiment and actions, results and effects brought by the configurations described hereinafter are merely examples. This disclosure can also be realized by a configuration other than that disclosed in the embodiment described hereinafter, and at least one of various effects and derivative effects based on the basic configuration can be obtained.

In the present embodiment, a vehicle 1 (a host vehicle) may be, for example, an automobile of which a drive source is an internal combustion engine (not illustrated), that is, an internal combustion engine vehicle, may be an automobile of which the drive source is an electric motor (not illustrated), that is, an electric vehicle, fuel-cell vehicle or the like, may be a hybrid vehicle of which a drive source is both the internal combustion engine and the electric motor, or may be a vehicle having another drive source. In addition, the vehicle 1 can mount various transmissions, or can mount various devices such as a system or components necessary for driving the internal combustion engine and the electric motor. In addition, a device, a method, the number, a layout relating to driving of vehicle wheels 3 of the vehicle 1 can be set variously.

Figure 1:
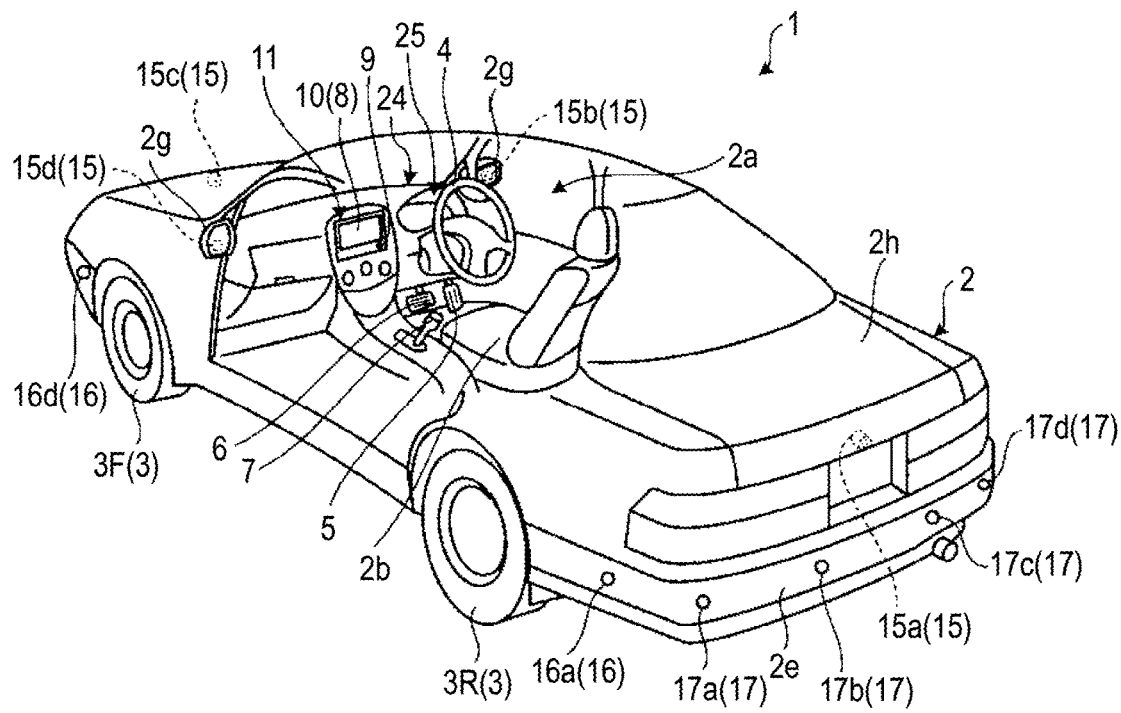
FIG. 1 is a perspective view illustrating an example of a state in which a part of a passenger compartment of a vehicle in an embodiment is seen.
Figure 2:
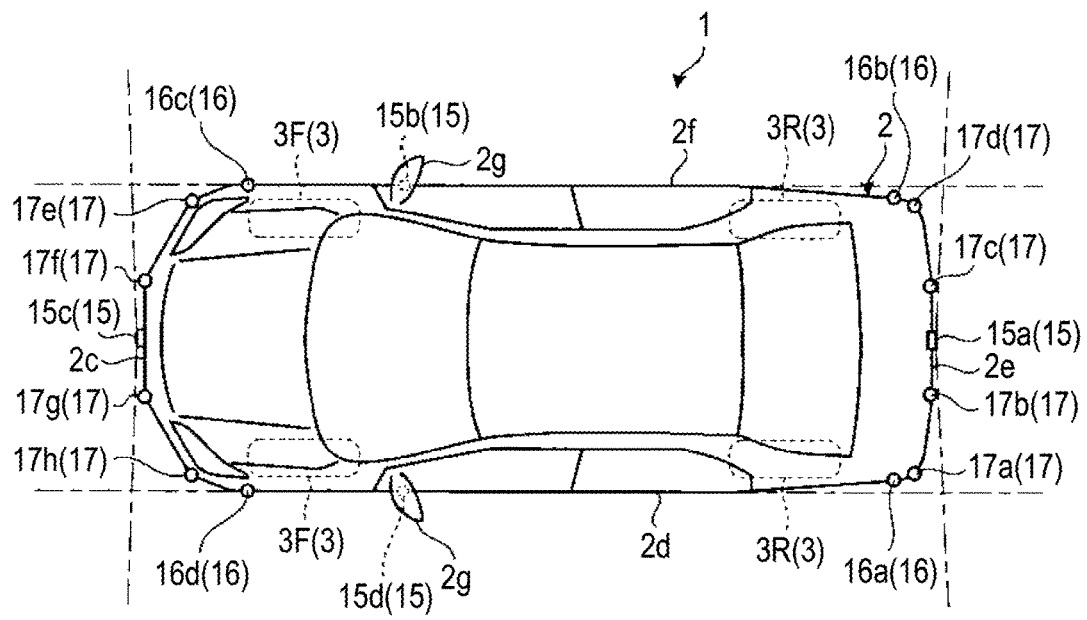
FIG. 2 is a plan view (overhead view) illustrating an example of the vehicle in the embodiment.

FIG. 1 is a perspective view illustrating an example of a state in which a part of a passenger compartment of the vehicle 1 in an embodiment is seen. FIG. 2 is a plan view (overhead view) illustrating an example of the vehicle 1 in the embodiment. As illustrated in FIG. 1, a vehicle body 2 configures a passenger compartment 2a in which occupants (not illustrated) are seated. In the passenger compartment 2a, a steering section 4, an acceleration operation section 5, a brake operation section 6, and a shift operation section 7 are provided in a state of facing a seat 2b of a driver as the occupants.

The steering section 4 is, for example, a steering wheel protruded from a dashboard 24. The acceleration operation section 5 is, for example, an accelerator pedal positioned under a foot of the driver. The brake operation section 6 is, for example, a brake pedal positioned under the foot of the driver. The shift operation section 7 is, for example, a shift lever protruding from a center console. The steering section 4, the acceleration operation section 5, the brake operation section 6, and the shift operation section 7 are not limited to those described above.

In addition, a display device 8 as a display output unit and a voice output device 9 as a voice output unit are provided in the passenger compartment 2a. The display device 8 is, for example, a liquid crystal display (LCD), an organic electro luminescent display (OELD), or the like. The voice output device 9 is, for example, a speaker. In addition, the display device 8 is covered by an operation input unit 10 such as a touch panel.

The occupants can visually recognize an image displayed on a display screen of the display device 8 via the operation input unit 10. In addition, the occupants can execute an operation input by operations such as touching, pressing or moving the operation input unit 10 by a finger on a position corresponding to the image displayed on the display screen of the display device 8. The display device 8, the voice output device 9, and the operation input unit 10 are provided on a monitor device 11 positioned on the dashboard 24 at a center portion in a vehicle width direction, that is, a horizontal direction.

The monitor device 11 can include an operation input unit (not illustrated) such as a switch, a dial, a joystick, a press button, or the like. In addition, a voice output device (not illustrated) can be provided at another position in the passenger compartment 2a that is different from the position of the monitor device 11, or the voice can be output from another voice output device that is different from the voice output device 9 of the monitor device 11. The monitor device 11 is also used as, for example, a navigation system or an audio system. A display device 12 which is different from the display device 8 is provided in the passenger compartment 2a.

Figure 3:
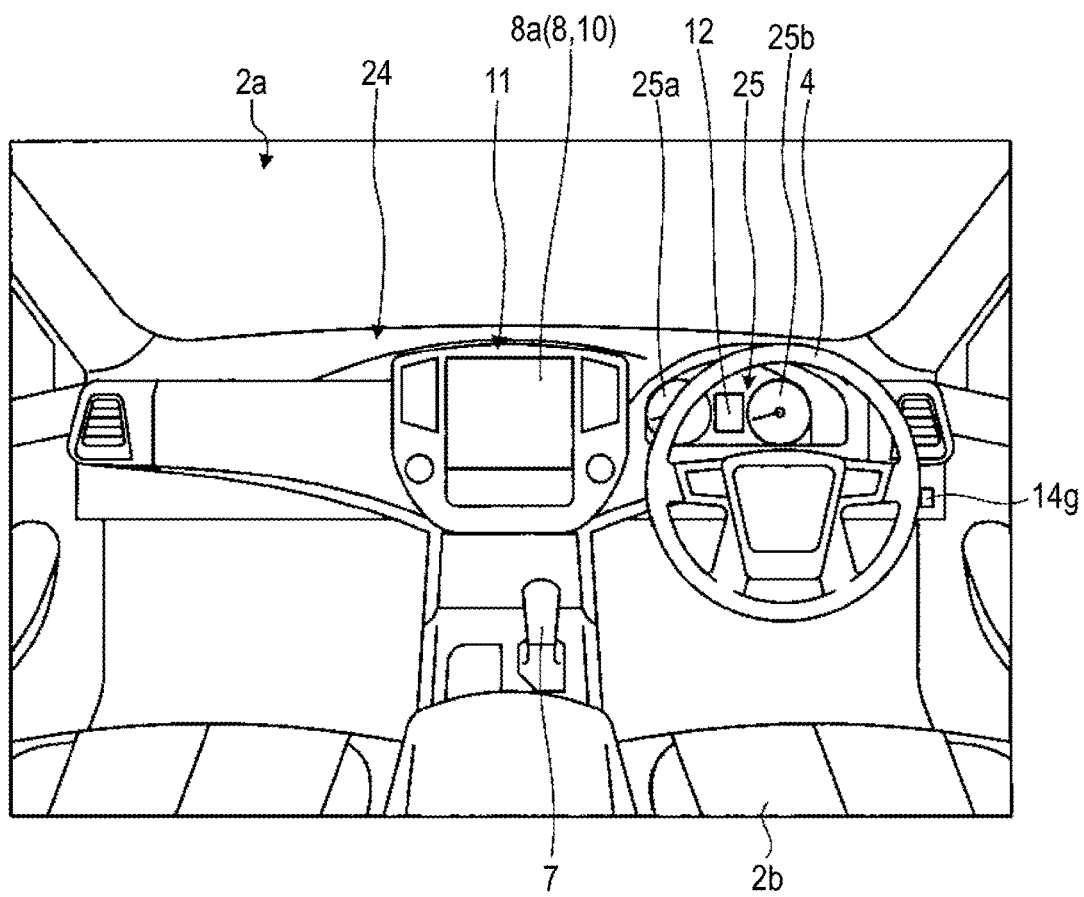
FIG. 3 is a diagram illustrating an example of a dashboard of the vehicle in the embodiment seen from a rear side of the vehicle.

FIG. 3 is a diagram illustrating an example of a dashboard 24 of the vehicle 1 in the embodiment seen from a rear side of the vehicle 1. As illustrated in FIG. 3, the display device 12 is provided, for example, on an instrument panel section 25 of the dashboard 24, and is positioned between a speed display section 25a and a rotational speed display section 25b at the substantially center of the instrument panel section 25. A size of a screen of the display device 12 is smaller than a size of a screen 8a of the display device 8. An image indicating information relating to the parking assistance of the vehicle 1 is mainly displayed on this display device 12. An amount of information displayed on the display device 12 may be smaller than an amount of information displayed on the display device 8. The display device 12 is, for example, the LCD or the OELD. The information displayed on the display device 8 may be displayed on the display device 12.

In addition, as illustrated in FIG. 1 and FIG. 2, the vehicle 1 is a four wheel vehicle, and includes right and left front wheels 3F and right and left rear wheels 3R. Any of these four vehicle wheels 3 are configured so as to be steered.

Figure 4:
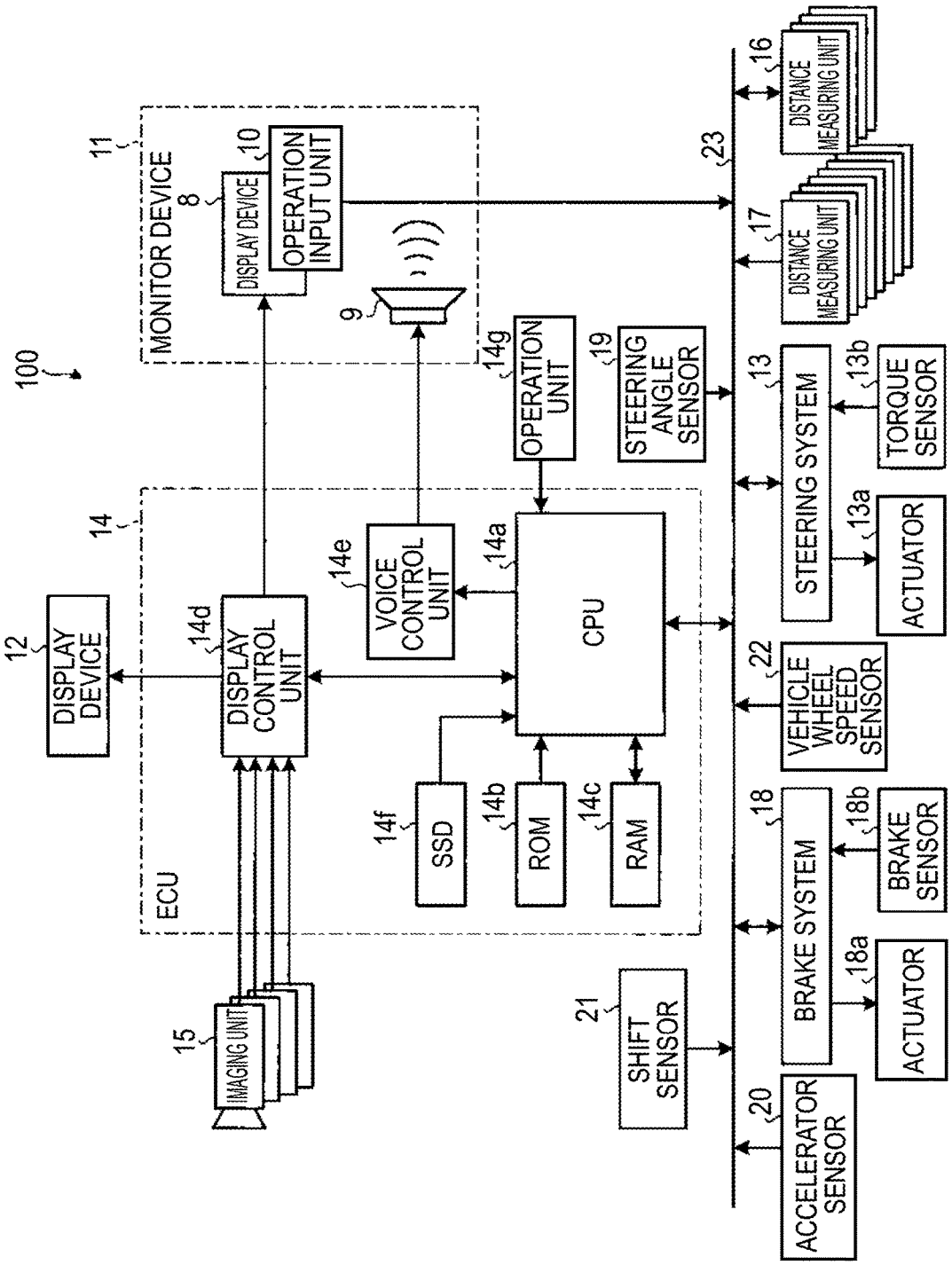
FIG. 4 is a block diagram illustrating an example of a configuration of a parking assistance system in the embodiment.

FIG. 4 is a block diagram illustrating an example of a configuration of a parking assistance system 100 in the embodiment. As illustrated in FIG. 4, the vehicle 1 includes the parking assistance system 100. The parking assistance system 100 is an example of the parking assistance device.

As illustrated in FIG. 4, the vehicle 1 includes a steering system 13 that steers at least two vehicle wheels 3. The steering system 13 includes an actuator 13a and a torque sensor 13b.

The steering system 13 is electrically controlled by an electronic control unit (ECU) 14 or the like, and operates the actuator 13a. The steering system 13 is, for example, an electric power steering system, a steer by wire (SBW) system, or the like. The steering system 13 supplements a steering force by adding a torque, that is, a assistant torque to the steering section 4 using the actuator 13a, or steers the vehicle wheels 3 using the actuator 13a. In this case, the actuator 13a steers two vehicle wheels 3. In addition, the torque sensor 13b detects, for example, a torque given to the steering section 4 from the driver.

In addition, as illustrated in FIG. 2, for example, four imaging units 15a to 15d are provided on the vehicle body 2 as a plurality of imaging units 15. The imaging unit 15 is a digital camera in which an imaging element such as a charge coupled device (CCD) or a CMOS image sensor (CIS) is incorporate. The imaging unit 15 can output moving picture data in a predetermined frame rate. The imaging unit 15 respectively includes a wide-angle lens and a fish-eye lens and can image a range of, for example, 140° to 190° in the horizontal direction. The imaging unit 15 sequentially images an external environment around the vehicle body 2 including a road surface where the vehicle 1 can move or an area where the vehicle 1 can park, and outputs the image as captured image data.

The imaging unit 15a is positioned, for example, at an end portion 2e on the rear side of the vehicle body 2 and is provided on a wall portion at a lower side of a door 2h of a rear trunk. The imaging unit 15b is positioned, for example, at an end portion 2f on the right side of the vehicle body 2 and is provided on a right side rear view mirror 2g. The imaging unit 15c is positioned, for example, at an end portion 2c on the front side, that is, the front side in the longitudinal direction of the vehicle body 2 and is provided on a front bumper or the like. The imaging unit 15d is positioned, for example, at an end portion 2d on the left side, that is, the left side in the vehicle width direction of the vehicle body 2 and is provided on a rear view mirror 2g as a left side protrusion portion.

The ECU 14 executes calculation processing and image processing based on the image data obtained from the imaging units 15, and for example, estimates a position (including a size, same hereinafter) of obstacles (another vehicle, a pole, or the like) in a parking lot, detects parking space candidates, and then, corrects positions of the parking space candidates, and guides the vehicle 1 to the corrected position of the parking space candidate (details will be described below).

In addition, as illustrated in FIG. 1 and FIG. 2, for example, four distance measuring units 16a to 16d and eight distance measuring units 17a to 17h are provided on the vehicle body 2 as a plurality of distance measuring units 16 and 17. The distance measuring units 16 and 17 are, for example, sonar items (ultrasonic detectors) that emit ultrasonic wave and catch reflected wave. The ECU 14 can identify the presence of the object such as the obstacle or the like positioned around the vehicle 1 and can measure the distance to the object according to the result of detection (sonar data) by the distance measuring units 16 and 17. The distance measuring unit 17 is used for detecting, for example, an object of relatively short distance, and the distance measuring unit 16 is used for detecting, for example, an object of relatively longer distance. In addition, the distance measuring unit 17 is used for detecting an object at the front and rear of the vehicle 1, and the distance measuring unit 16 is used for detecting an object at the sides of the vehicle 1.

In addition, as illustrated in FIG. 4, in a parking assistance system 100, a brake system 18, a steering angle sensor 19, an accelerator sensor 20, a shift sensor 21, and a vehicle wheel speed sensor 22 are electrically connected to each other via an in-vehicle network 23 as a telecommunication line in addition to the ECU 14, the monitor device 11, the steering system 13, and the distance measuring units 16 and 17.

The in-vehicle network 23 is configured, for example, as a controller area network (CAN). The ECU 14 can control the steering system 13, brake system 18, or the like by sending a control signal via the in-vehicle network 23. In addition, the ECU 14 can receive the result of detection by the torque sensor 13b, the brake sensor 18b, the steering angle sensor 19, the distance measuring unit 16, the distance measuring unit 17, the accelerator sensor 20, the shift sensor 21, the vehicle wheel speed sensor 22, and the like, or an operation signal of the operation input unit 10 via the in-vehicle network 23.

The ECU 14 includes, for example, a central processing unit (CPU) 14a, a read only memory (ROM) 14b, a random access memory (RAM) 14c, a display control unit 14d, a voice control unit 14e, a solid state drive (SSD) 14f (flash memory), or the like.

The CPU 14a can read out a program installed and stored in a non-volatile storage device such as the ROM 14b, and can execute the calculation processing according to the program. The RAM 14c temporarily stores various data used for the calculation by the CPU 14a. In addition, the display control unit 14d mainly executes the image processing using the image data obtained by the imaging unit 15 and the composition of the image data to be displayed on the display device 8 among the calculation processing items in the ECU 14. In addition, the voice control unit 14e mainly executes processing of the voice data output from the voice output device 9 among the calculation processing items in the ECU 14. In addition, the SSD 14f is a rewritable non-volatile storage unit, and can store data even in a case where the power of the ECU 14 is turned off. The CPU 14a, ROM 14b, RAM 14c, and the like are integrated in one package. In addition, the ECU 14 may be configured to use another logical operation processor or a logic circuit such as a digital signal processor (DSP) or the like instead of the CPU 14a. In addition, a hard disk drive (HDD), an electrically erasable programmable read only memory (EEPROM), or the like may be provided instead of the SSD 14f, and the SSD 14f, the HDD and the EEPROM may be provided separate from the ECU 14. In addition, an operation unit 14g is configured to include, for example, a push button or a switch, and outputs an operation signal when an operation relating to the parking assistance is performed by the driver or the like.

The brake system 18 is, for example, an anti-lock brake system (ABS) that suppresses a locking of the brake, an electronic stability control (ESC) that suppresses skidding of the vehicle 1 at the time of cornering, an electric brake system that enhances the braking force (executes a braking assist), a brake by wire (BBW), and the like.

The brake system 18 gives a braking force to the vehicle wheels 3 (the vehicle 1) via the actuator 18a. In addition, the brake system 18 can detect a locking of the brake, idling of the vehicle wheels 3, or signs of skidding from the rotation difference between the right and left vehicle wheels 3, and can execute various controls. A brake sensor 18b is, for example, a sensor that detects a position of a movable portion of the brake operation section 6. The brake sensor 18b can detect the position of the brake pedal as the movable portion of the brake operation section 6. The brake sensor 18b includes a displacement sensor.

The steering angle sensor 19 is a sensor that detects an amount of steering of the steering section 4 such as the steering wheel. The steering angle sensor 19 is configured using, for example, a hall element or the like. The ECU 14 acquires the amount of steering of the steering section 4 by the driver or an amount of steering of each vehicle wheel 3 in a case of automatic steering from the steering angle sensor 19, and executes various controls. The steering angle sensor 19 detects a rotation angle of a rotating part included in the steering section 4. The steering angle sensor 19 is an example of an angle sensor.

The accelerator sensor 20 is, for example, a sensor that detects a position of a movable portion of the acceleration operation section 5. The accelerator sensor 20 can detect the position of the accelerator pedal as the movable portion. The accelerator sensor 20 includes a displacement sensor.

The shift sensor 21 is, for example, a sensor that detects a position of a movable portion of the shift operation section 7. The shift sensor 21 can detect a position of a lever, an arm, a button, or the like as the movable portion of the shift operation section 7. The shift sensor 21 may include a displacement sensor or may be configured as a switch.

The vehicle wheel speed sensor 22 is a sensor that detects an amount of rotation or the number of rotations of the vehicle wheels 3 per unit time. The vehicle wheel speed sensor 22 outputs the number of the vehicle wheel speed pulses indicating the detected number of rotations as a sensor value. The vehicle wheel speed sensor 22 is configured using, for example, the hall element or the like. The ECU 14 calculates an amount of movement of the vehicle 1 based on the sensor value acquired from the vehicle wheel speed sensor 22, and executes various controls. In some cases, the vehicle wheel speed sensor 22 is provided on the brake system 18. In this case, the ECU 14 acquires the result of detection by the vehicle wheel speed sensor 22 via the brake system 18.

The configuration, the arrangement, and the electrical connection form of various sensors and the actuator described above are just examples, and can be variously set (changed).

In the present embodiment, the ECU 14 realizes at least a part of the functions as the parking assistance device by co-working of hardware and software (a control program).

Figure 5:
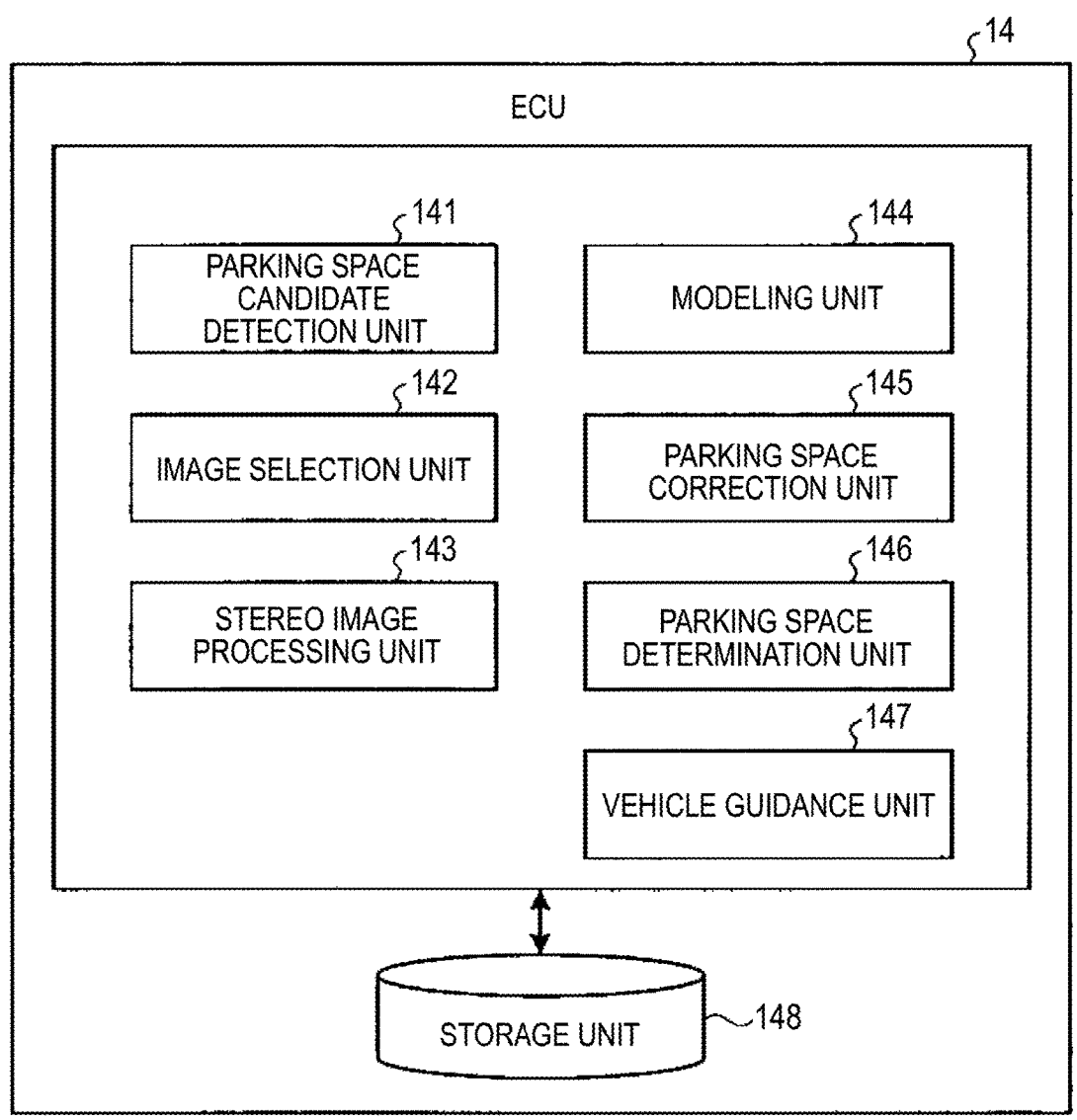
FIG. 5 is a functional configuration block diagram illustrating an example of an ECU in the embodiment.

FIG. 5 is a functional configuration block diagram illustrating an example of an ECU 14 in the embodiment. As illustrated in FIG. 5, the ECU 14 functions as a parking space candidate detection unit 141, an image selection unit 142, a stereo image processing unit 143, a modeling unit 144, a parking space correction unit 145, a parking space determination unit 146, a vehicle guidance unit 147, and a storage unit 148. The storage unit 148 stores the data used in calculation in the ECU 14 or the data calculated in the ECU 14.

The parking space candidate detection unit 141 estimates the position of each of obstacles based on the data of distance to the obstacle at the side directions measured by the distance measuring unit 16 when the vehicle 1 is travelling, and detects parking space candidates at the side directions (details will be described below).

When the parking space candidates are detected, the image selection unit 142 selects two or more captured images in which the inner side surface (the side surface on the parking space candidate side) of the obstacle adjacent to the parking space candidate is captured, among the captured images in which the surroundings of the vehicle 1 are captured by the imaging unit 15. In addition, in a case where a width of an entrance portion of the parking space candidate is equal to or larger than a first predetermined value, the image selection unit 142 selects two captured images of which the area of the inner side surface is largest and second largest from the captured images in which the inner side surface of an adjacent obstacle is captured, among the captured images in which the surroundings of the vehicle 1 are imaged. In addition, in a case where the width of the entrance portion of the parking space candidate is smaller than the first predetermined value, the image selection unit 142 selects all the captured images of which the area of the inner side surface is equal to or larger than the second predetermined value from the captured images in which the inner side surface of the adjacent obstacle is captured, among the images in which the surroundings of the vehicle 1 are imaged (details will be described below).

The stereo image processing unit 143 performs stereo image processing on the selected two or more captured images and calculates a three-dimensional point group of the obstacle. In addition, it is preferable that the stereo image processing unit 143 extracts the images of the obstacle and the vicinity of the obstacle for each of the selected two or more captured images, performs the stereo image processing on the extracted images, and calculates the three-dimensional point group (details will be described below).

The modeling unit 144 determines the position of the obstacle on the parking space candidate side based on the calculated three-dimensional point group (details will be described below). The modeling unit 144 is an example of a position determination unit.

The parking space correction unit 145 corrects the position of the parking space candidate based on the determined position of the obstacle on the parking space candidate side (details will be described below).

The parking space determination unit 146 determines whether or not the width of the entrance portion of the corrected parking space candidate is equal to or larger than a first threshold value (or a second threshold value) (details will be described below).

When it is determined that the width (the width of the entrance portion of the corrected parking space candidate) is equal to or larger than a first threshold value (or a second threshold value), the vehicle guidance unit 147 guides the vehicle 1 to the corrected position of the parking space candidate (details will be described below).

In addition, in a case where an adjacent obstacle is present at both sides of the parking space candidate and when the processing by the image selection unit 142, the processing by the stereo image processing unit 143, the processing by the modeling unit 144, and the processing by the parking space correction unit 145 with regard to the adjacent obstacle are finished, the parking space determination unit 146 determines whether or not the width of the entrance portion of the corrected parking space candidate is equal to or larger than the first threshold value. When it is determined that the width is equal to or larger than the first threshold value, the vehicle guidance unit 147 guides the vehicle 1 to the corrected position of the parking space candidate.

In the present embodiment, following two types of parking space conditions are used, which are conditions for determining whether or not the parking space candidate is appropriate as the parking space for the vehicle 1.

(Condition 1) The width of the entrance portion of the parking space candidate is equal to or larger than the first threshold value.

(Condition 2) The width of the entrance portion of the parking space candidate is equal to or larger than the second threshold value.

Here, the second threshold value is a threshold value larger than the first threshold value. In addition, proper usages of the first threshold value and the second threshold value will be described below.

In the present embodiment, the above-described two types of conditions such as the condition 1 and the condition 2 are used as the parking space condition. However, since there is no big difference in the first threshold value in the condition 1 and the second threshold value in the condition 2, a single condition may be used. In addition, not only the width of the entrance portion of the parking space candidate but also another element such as a width of a depth portion of the parking space candidate may be considered as the parking space condition.

Figure 6:
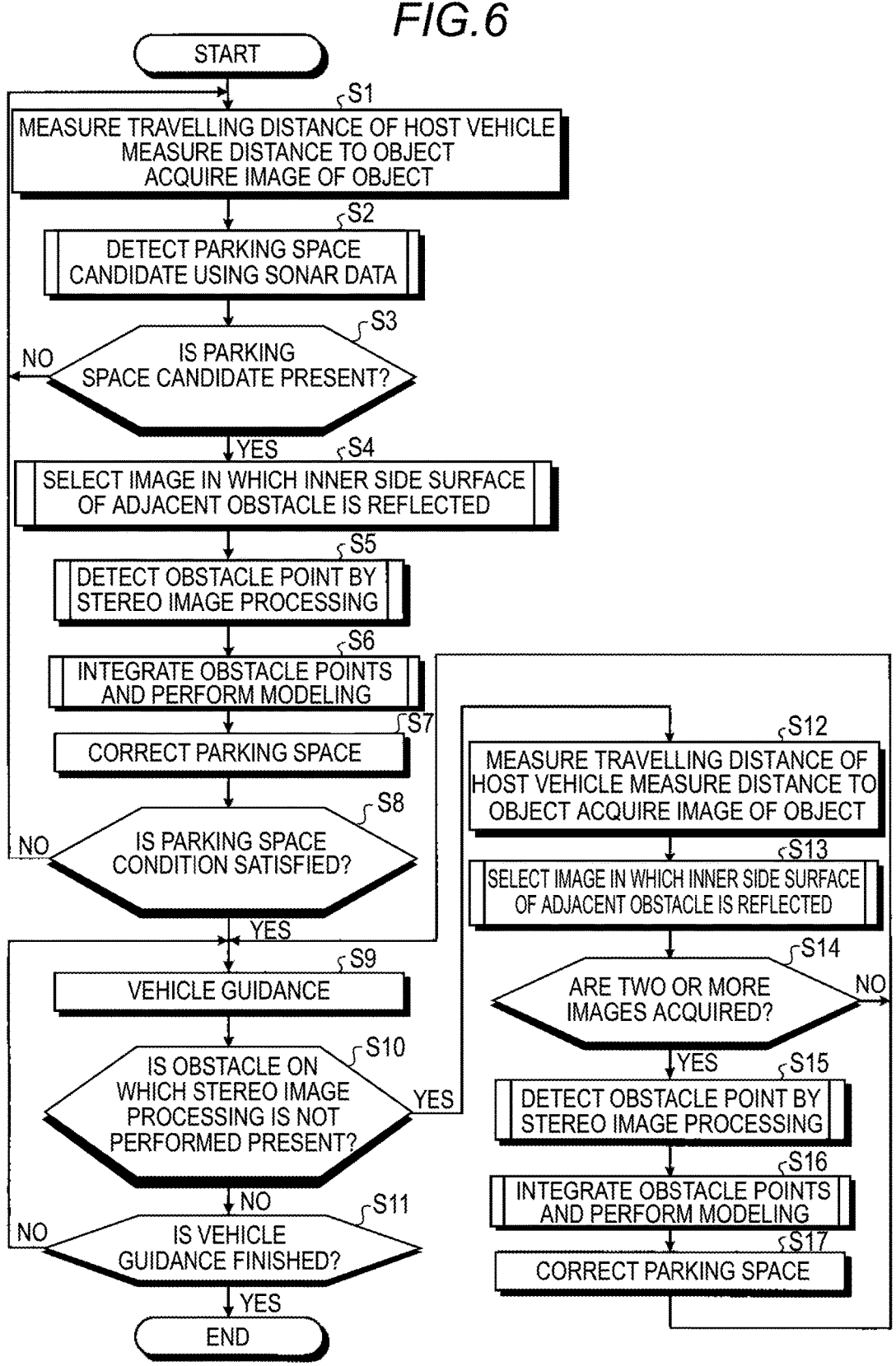
FIG. 6 is a flowchart illustrating an example of overall processing in the embodiment.

Next, an example of operations of the parking assistance system 100 in the embodiment will be described. The operations of the parking assistance system 100 are not limited to the operations described below. FIG. 6 is a flowchart illustrating an example of overall processing in the embodiment. The entity of operations other than the parking space candidate detection unit 141 to the vehicle guidance unit 147 is described as the ECU 14.

As illustrated in FIG. 6, for example, in a case where the driver drives the vehicle 1 at a low speed for searching for a parking space in a parallel parking lot, firstly, the ECU 14 performs measurement of a travelling distance of the host vehicle and measurement of a distance to an object, and then, performs the acquisition of an image of the object (STEP S1). As the measurement of the travelling distance of the host vehicle, the ECU 14 performs calculation using the result of detection from the vehicle wheel speed sensor 22 or the like, and calculates the travelling distance of the vehicle 1. In addition, as the measurement of the distance to the object, the ECU 14 measures the distance to the obstacle (object) positioned around the vehicle 1 using the result of detection (sonar data) from the distance measuring units 16 and 17. In addition, as the acquisition of an image of the object, the ECU 14 acquires an image of the obstacle (object) captured by the imaging unit 15.

Figure 7:
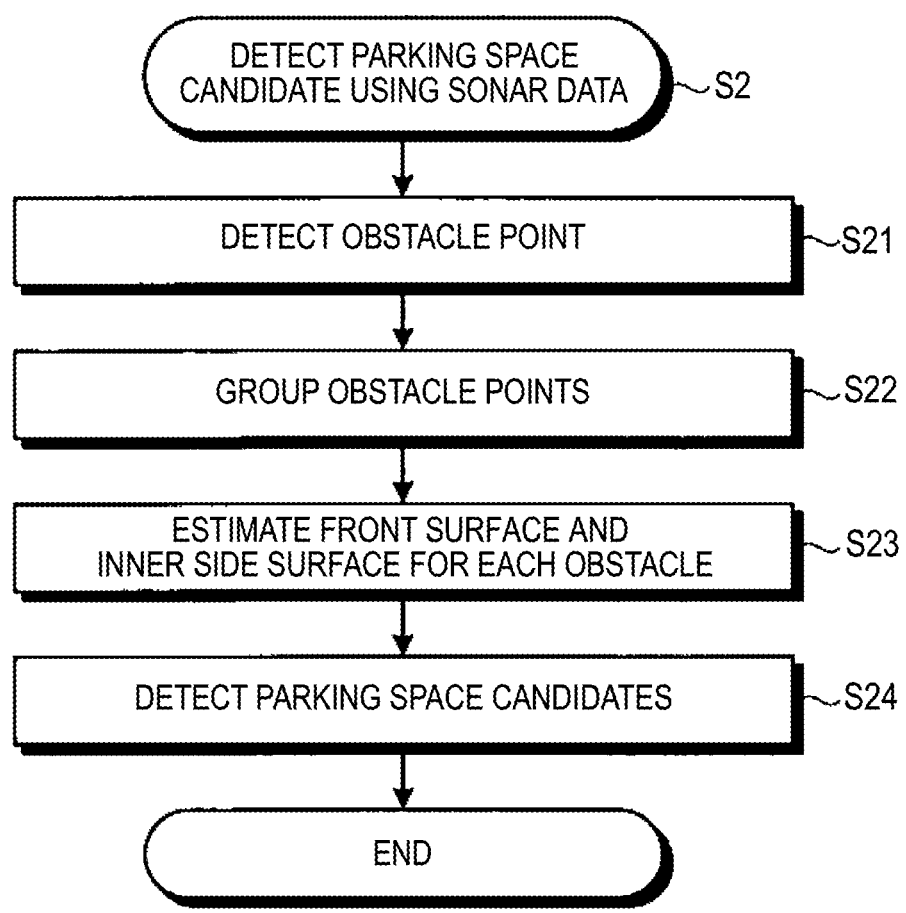
FIG. 7 is a flowchart illustrating an example of parking space candidate detection processing using sonar data in the embodiment.

Next, the parking space candidate detection unit 141 performs the parking space candidate detection processing using the sonar data (STEP S2). STEP S2 will be described using FIG. 7 and FIGS. 8A and 8B. FIG. 7 is a flowchart illustrating an example of the parking space candidate detection processing using sonar data in the embodiment. FIGS. 8A and 8B are diagrams describing the processing in FIG. 7.

First, the parking space candidate detection unit 141 detects an obstacle point using a principle of triangulation or the like using the sonar data and a moving speed of the vehicle 1 or the like (STEP S21). In the example in FIG. 8A, when the vehicle 1 passes through the front of other vehicles C1 and C2 in the parallel parking lot, the parking space candidate detection unit 141 detects obstacle points Ps.

Next, the parking space candidate detection unit 141 groups the obstacle points Ps based on mutual distances (STEP S22). In the example in FIG. 8A, the obstacle points Ps are grouped into a group 1 and a group 2.

The parking space candidate detection unit 141 estimates a front surface (a surface at the vehicle 1 side) and the inner side surface for each obstacle (STEP S23). In the example in FIGS. 8A and 8B, in a case where the obstacle points Ps are obtained as illustrated in FIG. 8A, the parking space candidate detection unit 141 estimates the front surface and the inner side surface as a straight line (a line segment) in a plan view for each group using the information on the travelling direction of the vehicle 1 also. As a result, as illustrated in FIG. 8B, a front surface X1 and an inner side surface Y1 are estimated with regard to the other vehicle C1 corresponding to the group 1, and a front surface X2 and an inner side surface Y2 are estimated with regard to the other vehicle C2 corresponding to the group 2.

Next, the parking space candidate detection unit 141 detects the parking space candidates from the information on the front surface and the inner side surface for each group (STEP S24). In an example in FIG. 8B, a parking space candidate S is detected between the inner side surface Y1 and the inner side surface Y2. In this STEP 24, the parking space candidate detection unit 141 detects the region which satisfies the condition 1 as the parking space candidate S.

As described above, according to STEP S2, the parking space candidate can be detected, but accuracy of the position is not high. Therefore, the correction for the position is performed as described below.

Returning to FIG. 6, in STEP S3 subsequent to STEP S2, the parking space candidate detection unit 141 determines whether or not the parking space candidate is present. In a case of Yes, the process proceeds to STEP S4 and in a case of No, returns to STEP S1.

Figure 9:
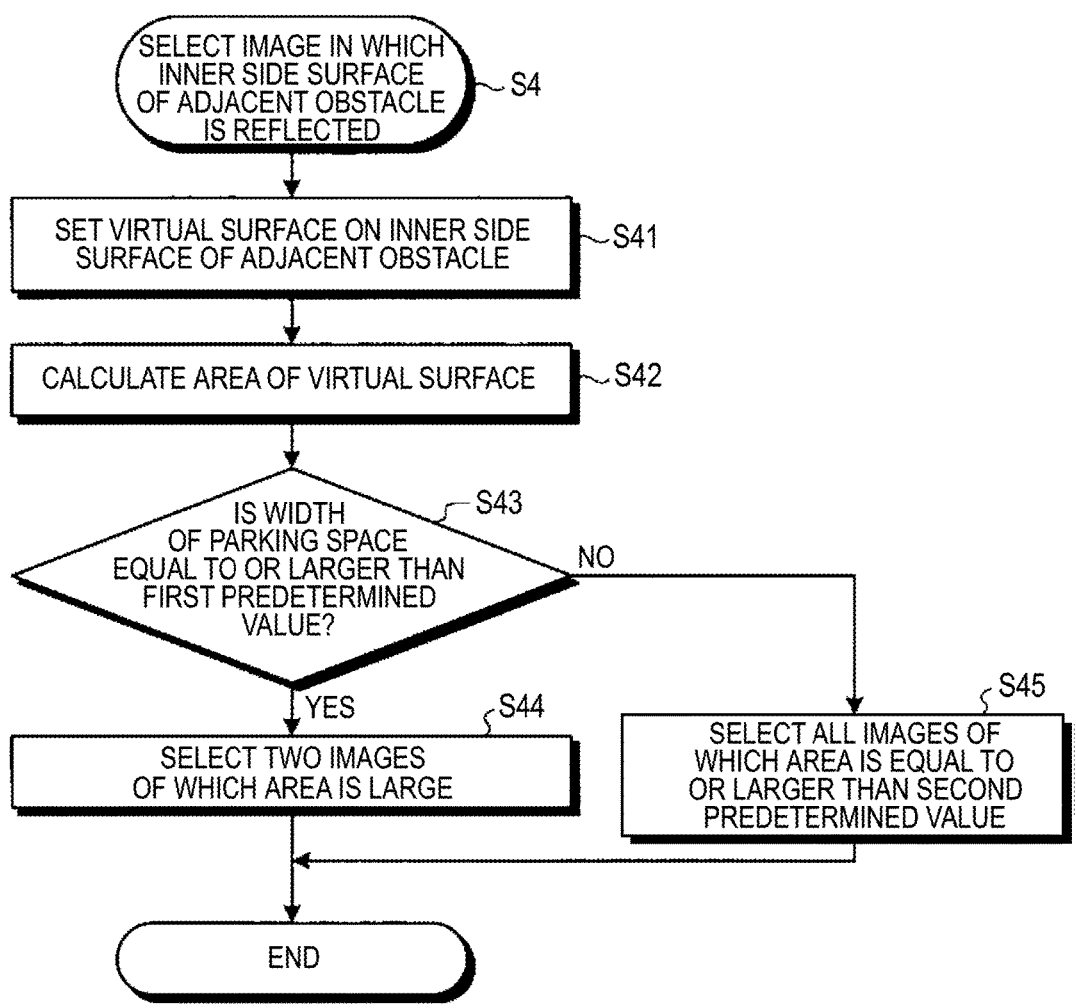
FIG. 9 is a flowchart illustrating an example of processing for selecting the image in which an inner side surface of an adjacent obstacle is captured, in the embodiment.
Figure 10A:
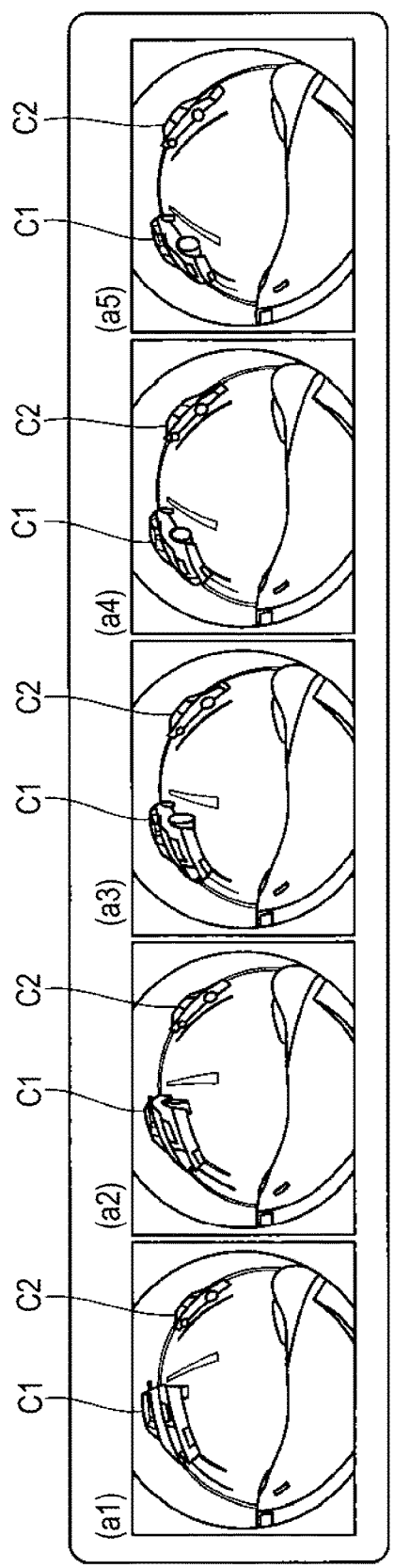
FIGS. 10A to 10C are diagrams describing the processing in FIG. 9.
Figure 10C:
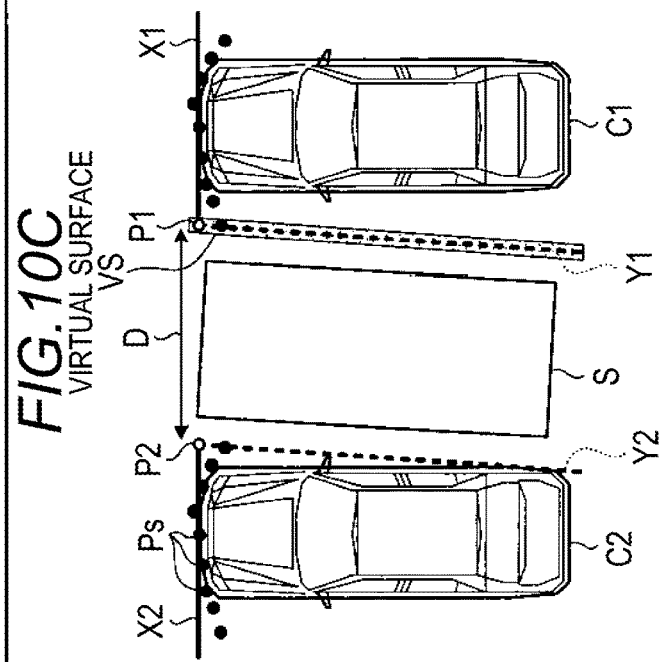
Figure 10B:
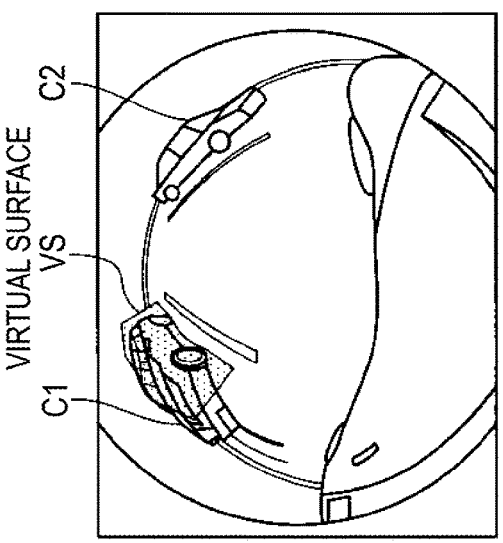

In STEP S4, the image selection unit 142 selects an image in which the inner side surface of the adjacent obstacle is captured. This STEP S4 will be described using FIG. 9 to FIG. 10O. FIG. 9 is a flowchart illustrating an example of the processing for selecting the image in the embodiment, in which the inner side surface of the adjacent obstacle is captured. FIG. 10A to FIG. 10C are diagrams describing the processing in FIG. 9.

First, the image selection unit 142 acquires the images in which the inner side surface of the adjacent obstacle is captured among the captured images in which the surroundings of the vehicle 1 are captured by the imaging unit 15, and sets a virtual surface (an approximate surface of the inner side surface) on the inner side surface of the adjacent obstacle for each image (STEP S41). In the example in FIG. 10A, the image in which the inner side surface of the adjacent obstacle is captured means four images of a1 to a5 among the five images of a1 to a5 with regard to the other vehicle C1. In addition, as illustrated in FIGS. 10B and 10O, the virtual surface VS relating to the other vehicle C1 is set in the inner side surface Y1.

Next, the image selection unit 142 calculates the area of the virtual surface for each image (STEP S42).

Next, the image selection unit 142 determines whether or not the width of the entrance portion of the parking space candidate is equal to or larger than the first predetermined value (STEP S43), and in a case of Yes, the process proceeds to STEP S44 and in a case of No, proceeds to STEP S45. In the example in FIG. 10O, the width of the entrance portion of the parking space candidate means a distance D between an end point P1 and an end point P2. The end point P1 is an intersection of the front surface X1 and the inner side surface Y1. The end point P2 is an intersection between the front surface X2 and the inner side surface Y2.

In STEP S44, the image selection unit 142 selects two images of which the area of the virtual surface is large from the images. In addition, in STEP S45, the image selection unit 142 selects all the images of which the area of the virtual surface is equal to or larger than a second predetermined value from the images. In the stereo image processing described below, two or more images in which the inner side surface is captured are needed. The reason why only two images are not selected in STEP S44 is to reduce the amount of processing in the stereo image processing. In addition, in STEP S45, three or more images are usually selected. The reason is that, since the width of the entrance portion of the parking space candidate is narrow, even if the amount of processing in the stereo image processing increases, the accuracy of correcting the position of the parking space candidate can be improved.

The images for obtaining the area of the virtual surface may be any one of the image having a distortion or the image having no distortion (image originally having no distortion or the image of which the distortion is corrected).

Figure 11:
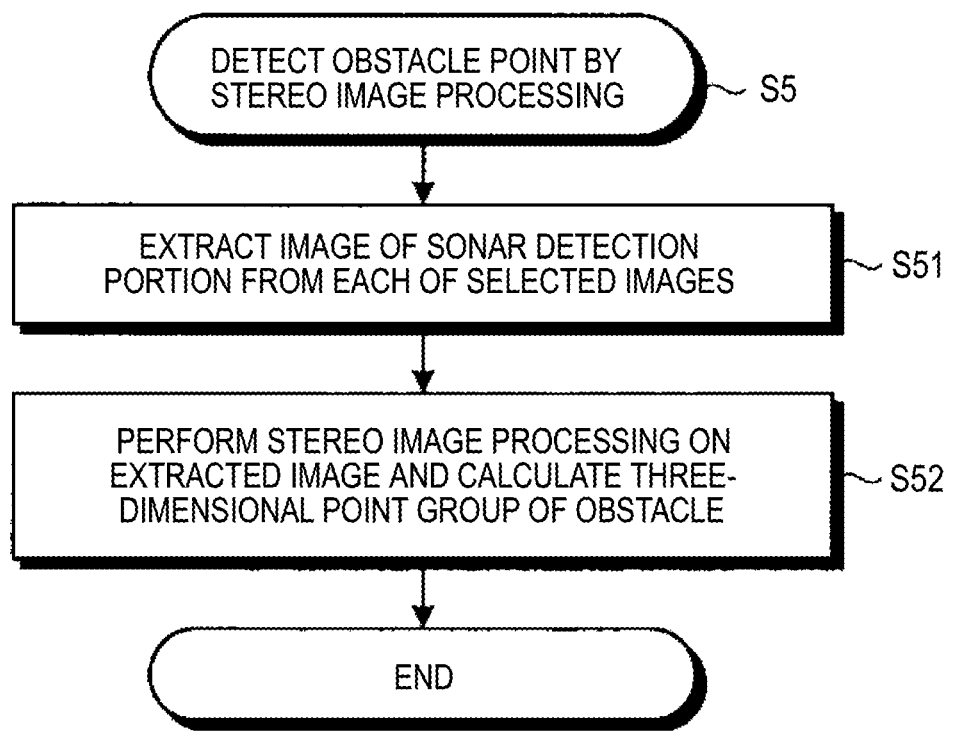
FIG. 11 is a flowchart illustrating an example of obstacle point detection processing in the stereo image processing in the embodiment.
Figure 12:
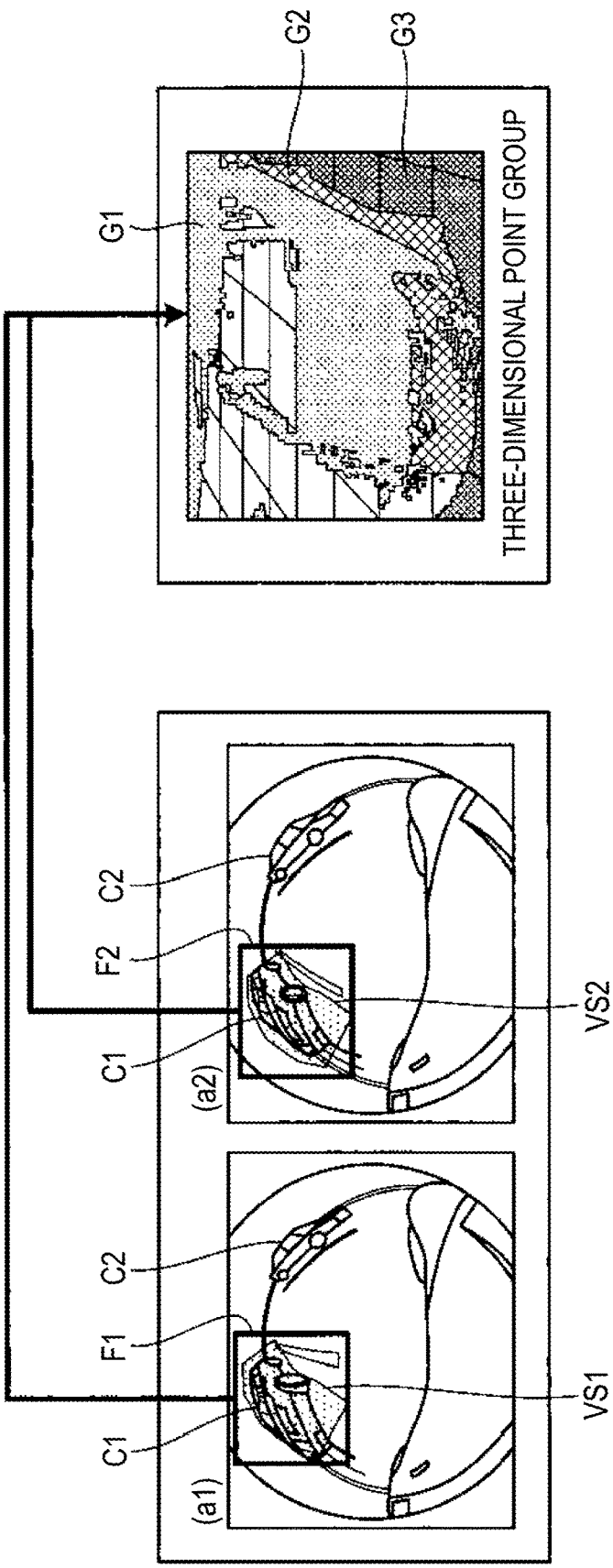
FIGS. 12A and 12B are diagrams describing the processing in FIG. 11.

Returning to FIG. 6, in STEP S5 subsequent to STEP S4, the stereo image processing unit 143 performs the stereo image processing on the selected two or more captured images and calculates the three-dimensional point group of the obstacle. STEP S5 will be described using FIG. 11 and FIGS. 12A and 12B. FIG. 11 is a flowchart illustrating an example of the obstacle point detection processing in the stereo image processing in the embodiment. FIGS. 12A and 12B are diagrams describing the processing in FIG. 11.

First, the stereo image processing unit 143 extracts the image of the sonar detection portion from each of the selected images (STEP S51). In the example in FIG. 12A, in the image of (a1), an image F1 that includes a virtual surface VS1 is extracted as the sonar detection portion with regard to the other vehicle C1. In addition, in the image of (a2), an image F2 that includes a virtual surface VS2 as the sonar detection portion is extracted as the sonar detection portion with regard to the other vehicle C1. By performing the extraction, an amount of processing performed in STEP S52 can be reduced.

Next, the stereo image processing unit 143 performs the stereo image processing on the extracted plural images and calculates the three-dimensional point group of the obstacle. The stereo image processing is an image processing technology of determining the three-dimensional coordinates of a subject based on the principle of triangulation using the two or more images in which the same subject is captured and of which the imaging angles are different from each other. As the stereo image processing method in the present embodiment, for example, known various methods such as a block matching method can be used.

In the example, in FIGS. 12A and 12B, as illustrated in FIG. 12B, as the three-dimensional point group relating to the other vehicle C1, a three-dimensional point group G1 (high position portion of the other vehicle C1), a three-dimensional point group G2 (low position portion of the other vehicle C1), and a three-dimensional point group G3 (road surface) are calculated.

Figure 13:
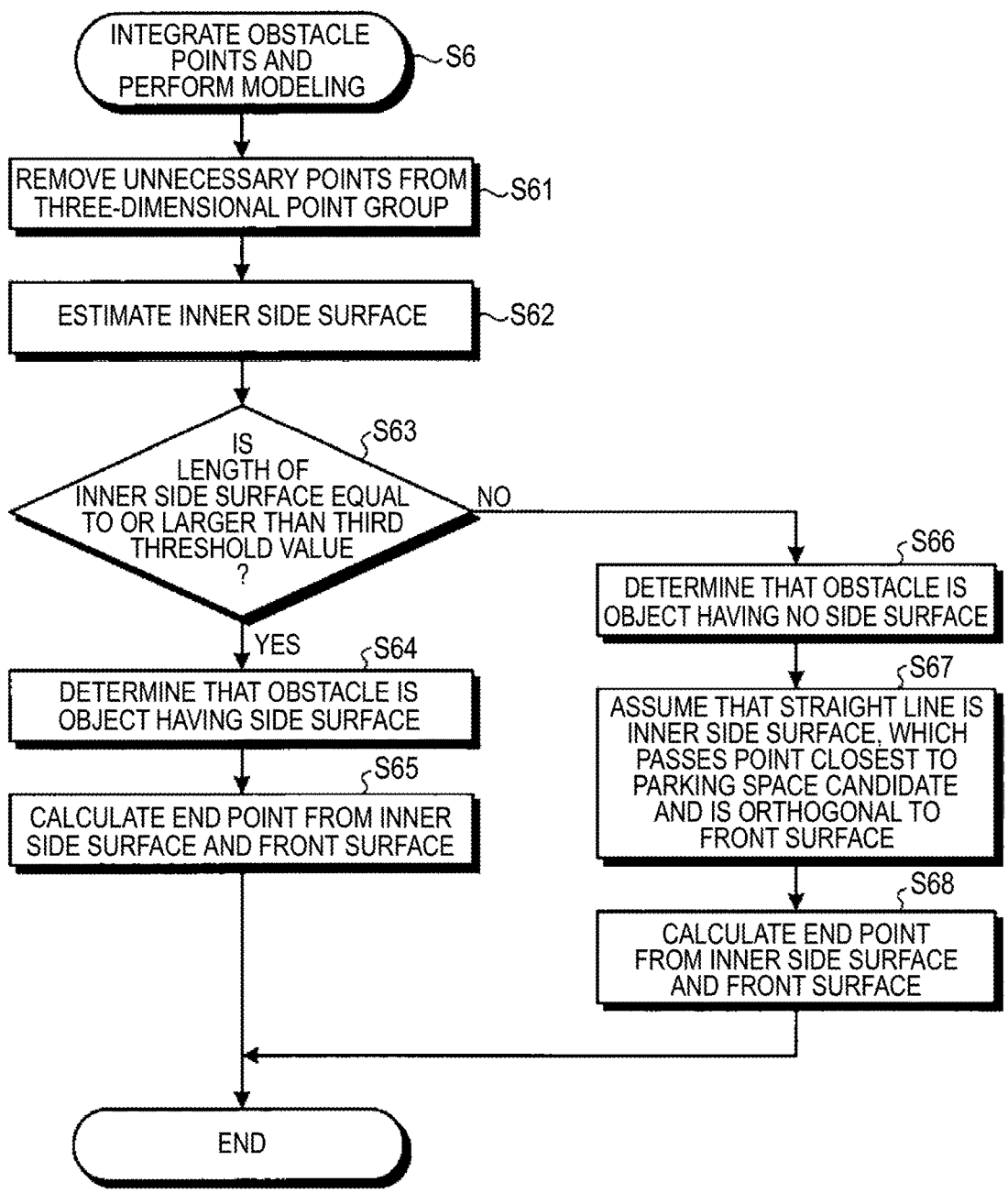
FIG. 13 is a flowchart illustrating an example of processing for integrating the obstacle points and modeling in the embodiment.

Returning to FIG. 6, in STEP S6 subsequent to STEP S5, the modeling unit 144 integrates the obstacle points and performs the modeling. The modeling in the present embodiment means the determination of the position of the obstacle on the parking space candidate side based on the calculated three-dimensional point group. When the accuracy of the modeling is high, it is possible to determine the position of the parking space candidate adjacent to the obstacle with high accuracy. Specifically, in the modeling in the present embodiment, the position of the front surface and the position of the inner side surface of the obstacle are determined and the intersection of those (the intersection in a plan view) can be determined as an end point. STEP S6 will be described using FIG. 13 and FIGS. 14A and 14B. FIG. 13 is a flowchart illustrating an example of processing for integrating the obstacle points and modeling in the embodiment. FIGS. 14A and 14B are diagrams describing the processing in FIG. 13.

First, the modeling unit 144 removes the unnecessary points of the obstacle from the three-dimensional point group (STEP S61). The unnecessary points are the points separated from the virtual surface equal to or larger than a predetermined value, the road surface, and a lower portion of a vehicle if the obstacle is a vehicle. For example, in the example in FIG. 12B, the three-dimensional point groups G2 and G3 among the three-dimensional point groups G1, G2, and G3 are the unnecessary points. In addition, in the example of the vehicle C illustrated in (a1) of FIG. 14A, the outside of an area A1 is a point separated from the virtual surface VS3 equal to or larger than a predetermined value. In addition, in the example of a hexagonal pole Q illustrated in (b1) of FIG. 14B, the outside of an area A2 is a point separated from the virtual surface VS4 equal to or larger than the predetermined value.

Next, the modeling unit 144 estimates the inner side surface of the obstacle based on the three-dimensional point group from which the unnecessary points are removed (STEP S62). In the example of the vehicle C illustrated in (a1) of FIG. 14A, the inner side surface Y3 is estimated based on a three-dimensional point R. In addition, in the example of the hexagonal pole Q illustrated in (b1) of FIG. 14B, a straight line obtained by connecting five three-dimensional points R is estimated as the inner side surface.

Next, the modeling unit 144 determines whether or not the length of the estimated inner side surface is equal to or larger than a third predetermined threshold value (STEP S63), and the process proceeds to STEP S64 in a case of Yes, and proceeds to STEP S66 in a case of No. The third predetermined threshold value may be set as a value that can determine whether the obstacle is a vehicle or a non-vehicle (such as a pole and a traffic cone). In this STEP S63, for example, in the example of the vehicle C illustrated in (a1) of FIG. 14A, the length of the inner side surface Y3 is equal to or larger than the third predetermined threshold value, and thus, the result of determination is Yes. In addition, in the example of the hexagonal pole Q illustrated in (b1) of FIG. 14B, the length of the inner side surface which is a straight line obtained by connecting five three-dimensional points R is smaller than the third predetermined threshold value, and thus, the result of determination is No.

In STEP S64, the modeling unit 144 determines that the obstacle is an object having a side surface, and in STEP S65, determines that the inner side surface estimated in STEP S62 as the inner side surface, and then, calculates the end point from the intersection of the inner side surface and the front surface estimated by the sonar data. For example, in the example of the vehicle C illustrated in (a1) and (a2) in FIG. 14A, the inner side surface Y3 is determined as the inner side surface, and the end point P3 is calculated from the intersection of the inner side surface Y3 and the front surface X3 which is a straight line determined by the sonar data.

In addition, in STEP S66, the modeling unit 144 determines that the obstacle is an object having no side surface, and in STEP S67, assumes that a straight line is the inner side surface, which passes a point closest to the parking space candidate among the three-dimensional points used in estimating the inner side surface of the obstacle in STEP S62 and is orthogonal to the front surface (orthogonal in plan view). Furthermore, in STEP S68, the modeling unit 144 calculates the end point from the intersection of the inner side surface assumed in STEP S67 and the front surface estimated by the sonar data. For example, in the example of the hexagonal pole Q illustrated (b1) and (b2) of FIG. 14B, a straight line Y4 is assumed as the inner side surface, which passes a point closest to the parking space candidate among the five three-dimensional points R and is orthogonal to the front surface X4, and the end point P4 is calculated from the intersection of the inner side surface Y4 and the front surface X4.

As described above, regardless of whether the obstacle is a vehicle or not, it is possible to obtain each information on the front surface, the inner side surface and the end point which is the intersection thereof necessary for modeling of the obstacle with high accuracy.

Returning to FIG. 6, in STEP S7 subsequent to STEP S6, the parking space correction unit 145 corrects the position of the parking space candidate based on the position information (the front surface, the inner side surface, and end point) of the obstacle on which the modeling is performed. STEP S7 will be described with reference to FIGS. 15A and 15B. FIGS. 15A and 15B are diagrams describing processing for correcting the position of the parking space candidate. A non-corrected parking space candidate S1 illustrated in FIG. 15A is estimated based on the front surface X1, the inner side surface Y1, and the end point P1 relating to the other vehicle C1 and the front surface X2, the inner side surface Y2, and the end point P2 relating to the other vehicle C2. However, the error is large (similar to that in FIG. 8B). On the other hand, a corrected parking space candidate S2 illustrated in FIG. 15B is corrected based on the front surface X1N, the inner side surface Y1N, and the end point P1N on which the modeling is performed relating to the other vehicle C1 and the front surface X2N, the inner side surface Y2N, and the end point P2N on which the modeling is performed relating to the other vehicle C2. Therefore, the error is small.

Returning to FIG. 6, in STEP S8 subsequent to STEP S7, the parking space determination unit 146 determines whether or not the parking space condition is satisfied based on the corrected position of the parking space candidate, and the process proceeds to STEP S9 in a case of Yes and returns to STEP S1 in a case of No. The above-described condition 1 and the condition 2 are the parking space condition. In a case where an adjacent obstacle is present at both sides of the parking space candidate, if the modeling (STEP S6) for the adjacent obstacles at both sides is finished, the condition 1 is used. As a case where the modeling (STEP S6) for the adjacent obstacles at both sides is not finished, for example, a below-described case may be considered. Using the example in FIG. 8A, the case is as follows. For example, in a case where the vehicle 1 travels at a low speed in a state of head light ON in a dark environment at night or the like, it is possible to acquire two or more images in which the inner side surface of the other vehicle C2 is captured due to the light from the head light. However, because the inner side surface of the other vehicle C1 is dark, it is not possible to acquire two or more images in which the inner side surface of the other vehicle C1 is captured. In such a case, the condition 2 is used as the parking space condition.

Figure 16A:
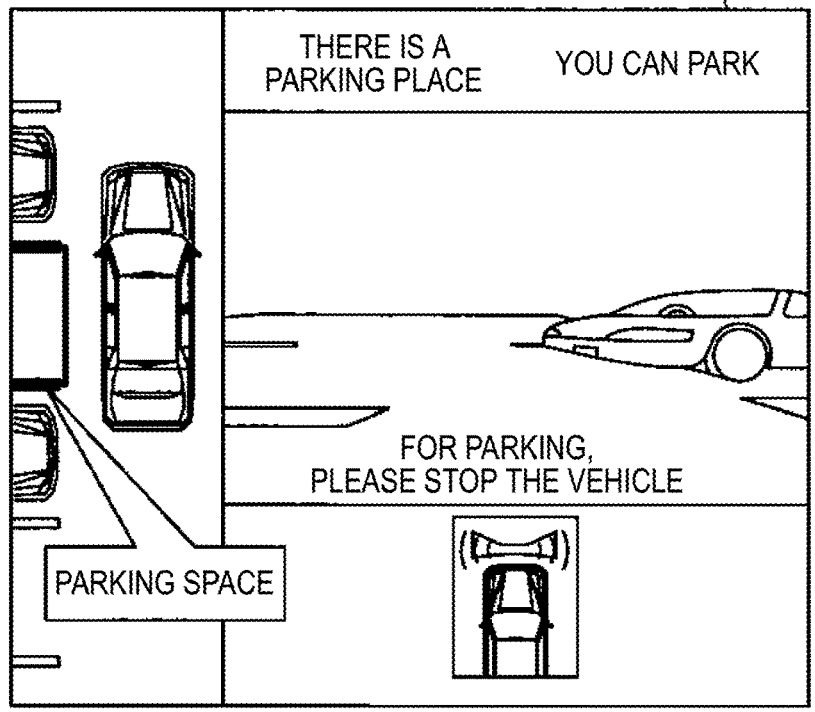
FIGS. 16A and 16B are screens illustrating an example of a case of displaying a parking space candidate in the embodiment.
Figure 16B:
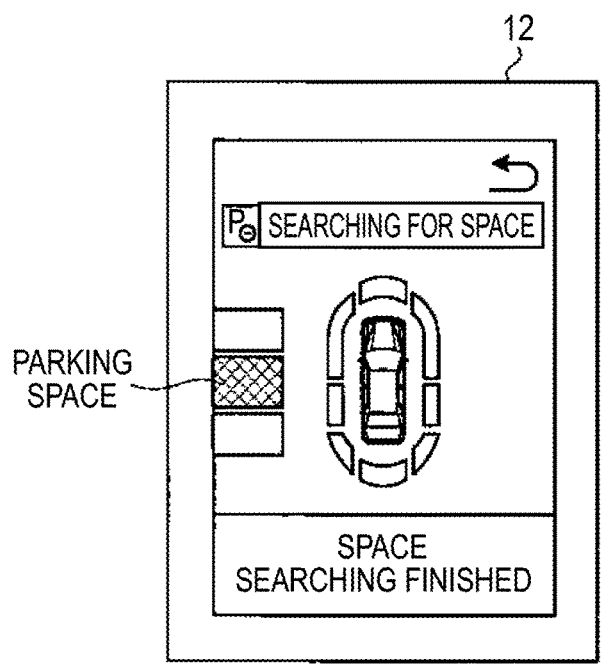

Returning to FIG. 6, in STEP S9, the vehicle guidance unit 147 guides the vehicle 1 to the corrected position of the parking space candidate. In this case, it is preferable to display the parking space candidate or the like for the driver. FIGS. 16A and 16B are screens illustrating an example of a case of displaying a parking space candidate in the embodiment. As illustrated in FIG. 16A, the parking space candidate (the parking space) is displayed on a screen 8a of the display device 8. In a case where the driver wants to park in the parking space candidate, a vehicle guidance in STEP S9 is started by a driver's predetermined operation on the operation input unit 10 (touch panel). In addition, as illustrated in FIG. 16B, a parking space candidate or the like may also be displayed on the display device 12.

In a case where the vehicle guidance is started in STEP S9, for example, the vehicle 1 is in an automatic steering mode. In the automatic steering mode, the drive does not need to operate the steering section 4, specifically, does not need to operate the steering wheel. In addition, a creeping which is a transferred engine driving force is used as a forward driving force and a backward driving force of the vehicle 1 without performing the operation of pressing the accelerator pedal which is an operation of the acceleration operation section 5. Therefore, the driver performs only the operation of the brake pedal as the brake operation section 6 and the shift lever as the shift operation section 7 according to the displays on the display devices 8 and 12. In the automatic steering mode, the brake pedal as the brake operation section 6 and the shift lever as the shift operation section 7 may be automatically operated.

In addition, when describing a trajectory of the vehicle guidance using FIG. 15B, the trajectory may pass through the midpoint of the end point P1N and the end point P2N and pass through the middle line of the inner side surface Y1N and the inner side surface Y2N. In addition, in a case where the adjacent obstacle is present only in one side of the parking space candidate, for example, the trajectory may be determined with a reference in the inner side surface of the obstacle in the one side and the end point.

Returning to FIG. 6, in STEP S10 subsequent to STEP S9, the ECU 14 determines whether or not the obstacle on which the stereo image processing is not performed is present among the obstacle adjacent to the parking space candidate, and the process proceeds to STEP S12 in a case of Yes and proceeds to STEP S11 in a case of No. The case where the obstacle on which the stereo image processing is not performed is present means a specific case where, as described above for example, the adjacent obstacles are present at both sides of the parking space candidate and the modeling (STEP S6) is not performed completely on the adjacent obstacle at one side due to the dark environment at night. That is, in many scenes, it is determined as No in STEP S10 and the process proceeds to STEP S11.

In STEP S11, the vehicle guidance unit 147 determines whether or not the vehicle guidance is finished, and the process ends in a case of Yes and returns to STEP S9 in a case of No. The case where the vehicle guidance is finished means, for example, a case where the vehicle 1 arrives at the position of the parking space candidate or a case where the driver performs the operation for finishing the vehicle guidance on the operation input unit 10 (the touch panel).

In a case of Yes in STEP S10, the processing items in STEPs S12 to S17 are executed. However, the processing items in STEPs S12, S13, S15, S16, and S17 are similar to those in STEPs S1, S4, S5, S6, and S7, and thus the description thereof will be omitted.

In STEP S14, the ECU 14 determines whether or not two or more images are acquired, in which the inner side surface is captured relating to the obstacle on which the stereo image processing is not performed, and the process proceeds to STEP S15 in a case of Yes and returns to STEP S9 in a case of No. Using the example in FIG. 8A, for example, in a case where the vehicle 1 travels at a low speed in a state of head light ON in a dark environment at night or the like, since the inner side surface of the other vehicle C1 does not become bright even by the light from the head light, in some cases it is not possible to acquire two or more images in which the inner side surface of the other vehicle C1 is captured. However, since it is possible to acquire two or more images in which the inner side surface of the other vehicle C2 is captured, the processing items in STEPs S4 to S7 relating to the other vehicle C2 are executed, and the result of determination in STEP S8 becomes Yes and the vehicle guidance is executed in STEP S9. In this case, if the parking lot is a parallel parking lot, the vehicle guidance for backward parking is performed on the vehicle 1, and at this time, the inner side surface of the other vehicle C1 is illuminated with tail lights and backup lights of the vehicle 1. Therefore, in some cases it is possible to acquire two or more captured images in which the inner side surface of the other vehicle C1 is captured. Accordingly, the stereo image processing is executed on the other vehicle C1, and it is possible to correct the parking space candidate based on the result of the stereo image processing before the vehicle 1 enters parking space candidate.

As described above, according to the parking assistance system 100 in the present embodiment, it is possible to quickly determine the position of the parking space candidate (target parking position) with high accuracy by performing the stereo image processing on two or more captured images in which the inner side surface of the obstacle adjacent to the parking space candidate is captured and calculating the three-dimensional point group of the obstacle.

In addition, for each of the adjacent obstacles at both sides of the parking space candidate, if two or more captured images in which the inner side surface is captured can be acquired, it is possible to determine the position of the parking space candidate (target parking position) with high accuracy before the vehicle guidance.

In addition, at the time of performing the stereo image processing, the amount of image processing can be reduced and the entire processing time is reduced by extracting the image of the obstacle and the vicinity of the obstacle from the image.

In addition, when the width in the parking space candidate at the vehicle 1 side is narrow, it is possible to further accurately determine the position of the parking space candidate (target parking position) by acquiring many captured images in which the inner side surface of the adjacent obstacle is captured without being limited to two.

In addition, for example, in the dark environment such as at night, even in a case where two or more captured images cannot be acquired, in which the inner side surface of one of the two adjacent obstacles is captured, in a case of a parallel backward parking after the vehicle guidance is started, since the obstacles are illuminated with the tail lights and backup lights, two or more captured images in which the inner side surface is captured are acquired, and thus, it is possible to update the position of the parking space candidate based on the two or more captured images before the vehicle 1 enters the parking space candidate.

Therefore, since the correction (backward driving) of the position of the parking space candidate is finished before the vehicle 1 enters the parking space candidate compared to the method 1 in the related art, the forward and backward turnings or the like do not occur, and thus, it does not take a time in parking.

In addition, using the stereo image processing, the position of a vehicle which is an obstacle can be specified with high accuracy regardless of the sampling rate in imaging compared to the method 2 in the related art and even the position of obstacles having various shapes other than the vehicle such as a pole or a road cone can be specified with high accuracy. Therefore, it is possible to specify the position of the parking space candidate with high accuracy.

A parking assistance device according to an embodiment is a parking assistance device that performs a parking assistance. The parking assistance device includes: a parking space candidate detection unit that estimates a position of each of obstacles based on data of distance to the obstacles at both sides of a host vehicle when the host vehicle on which the parking assistance device is mounted is traveling, and detects a parking space candidate at the sides of the host vehicle; an image selection unit that selects two or more captured images in which an inner side surface of the adjacent obstacle adjacent to the parking space candidate on the side of the parking space candidate is captured among the images captured by an imaging unit provided on the host vehicle, in which the surroundings of the host vehicle are imaged, when the parking space candidate is detected; a stereo image processing unit that performs stereo image processing on the selected two or more captured images and calculates a three-dimensional point group of the obstacle; a position determination unit that determines a position of the obstacle on the parking space candidate side based on the calculated three-dimensional point group; and a parking space correction unit that corrects the position of the parking space candidate based on the determined position of the obstacle on the parking space candidate side. According to this configuration, for example, the stereo image processing is performed on two or more captured images in which the inner side surface of the obstacle adjacent to the parking space candidate is captured, and the three-dimensional point group is calculated. Therefore, it is possible to quickly determine the position of the parking space candidate (target parking position) with high accuracy.

The parking assistance device according to the embodiment may be configured such that the parking assistance device further includes: a parking space determination unit that determines whether or not a width of an entrance portion of the corrected parking space candidate is equal to or larger than a first threshold value; and a vehicle guidance unit that guides the host vehicle to the corrected position of the parking space candidate when it is determined that the width is equal to or larger than the first threshold value, in which in a case where the adjacent obstacles are present at both sides of the parking space candidate and when processing by the image selection unit, processing by the stereo image processing unit, processing by the position determination unit, and processing by the parking space correction unit are completely performed on the adjacent obstacles, the parking space determination unit determines whether or not the width of the corrected entrance portion of the parking space candidate is equal to or larger than the first threshold value, and when it is determined that the width is equal to or larger than the first threshold value, the vehicle guidance unit guides the host vehicle to the corrected position of the parking space candidate. According to this configuration, for example, for each of the adjacent obstacles at both sides of the parking space candidate, if two or more captured images in which the inner side surface is captured can be acquired, it is possible to determine the position of the parking space candidate (target parking position) with high accuracy before the vehicle guidance.

The parking assistance device according to the embodiment may be configured such that, in a case where the adjacent obstacles are present at both sides of the parking space candidate, and when the processing by the stereo image processing unit and the processing by the position determination unit are not performed on the adjacent obstacles on one side because the selection of two or more captured images is not completely performed by the image selection unit, the parking space correction unit corrects the position of the parking space candidate based on a position of the adjacent obstacle in the side other than the side where the position on the parking space candidate side is determined, the parking space determination unit determines whether or not the width of the entrance portion of the corrected parking space candidate is equal to or larger than a second threshold value which is larger than the first threshold value, when it is determined that the width is equal to or larger than the second threshold value, the vehicle guidance unit starts the operation of guiding the host vehicle to the corrected position of the parking space candidate, after starting the operation, when the image selection unit acquires two or more captured images in which the inner side surface of the obstacle adjacent at one side is captured, the processing by the stereo image processing unit, the processing by the position determination unit, and the processing by the parking space correction unit are performed on the adjacent obstacle at one side, and the positions of the parking space candidates are updated, and the vehicle guidance unit guides the host vehicle to the updated position of the parking space candidate. According to this configuration, for example, in the dark environment such as at night, even in a case where two or more captured images cannot be acquired, in which the inner side surface of one of the two adjacent obstacles is captured, in a case of a parallel backward parking after the vehicle guidance is started, since the obstacles are illuminated with the tail lights and backup lights, two or more captured images in which the inner side surface is captured are acquired, and thus, it is possible to update the position of the parking space candidate based on the two or more captured images before the host vehicle enters the parking space candidate.

The parking assistance device according to the embodiment may be configured such that the stereo image processing unit extracts the image of the obstacle and the vicinity of the obstacle for each of the selected two or more captured images, performs the stereo image processing on the extracted image, and calculates a three-dimensional point group of the obstacle. According to this configuration, for example, the amount of image processing can be reduced and the entire processing time is reduced.

The parking assistance device according to the embodiment may be configured such that, in a case where the width of the entrance portion of the parking space candidate is equal to or larger than the first predetermined value, the image selection unit selects two captured images of which the area of the inner side surface is largest and second largest from the captured images in which the inner side surface of the adjacent obstacle is captured among the images in which the surroundings of the host vehicle are imaged, and in a case where the width of the entrance portion of the parking space candidate is smaller than the first predetermined value, the image selection unit selects all the captured images of which the area of the inner side surface is equal to or larger than the second predetermined value from the captured images in which the inner side surface of the adjacent obstacle is captured among the images in which the surroundings of the host vehicle are imaged. According to this configuration, for example, when the width of the entrance portion of the parking space candidate is narrow, it is possible to further accurately determine the position of the parking space candidate (target parking position) by acquiring many captured images in which the inner side surface of the adjacent obstacle is captured without being limited to two.

The embodiment disclosed above does not limit the scope of this disclosure, and is only an example included in the scope of this disclosure. A certain embodiment disclosed here may be an embodiment in which, for example, at least a part of the specific usage, the structure, the shape, the action, and the effect are changed, omitted, and added to or from the embodiment described above without departing from the spirit of this disclosure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device that performs a parking assistance, comprising:
   a parking space candidate detection unit that estimates a position of each of obstacles based on data of distance to the obstacles at both sides of a host vehicle when the host vehicle on which the parking assistance device is mounted is traveling, and detects a parking space candidate at the sides of the host vehicle;
   an image selection unit that selects two or more captured images in which an inner side surface of an adjacent obstacle adjacent to the parking space candidate on the side of the parking space candidate is captured among images captured by an imaging unit provided on the host vehicle, in which the surroundings of the host vehicle are imaged, when the parking space candidate is detected;
   a stereo image processing unit that performs stereo image processing on the selected two or more captured images and calculates a three-dimensional point group of the obstacle;
   a position determination unit that determines a position of the obstacle on the parking space candidate side based on the calculated three-dimensional point group;
   a parking space correction unit that corrects a position of the parking space candidate based on the determined position of the obstacle on the parking space candidate side;
   a parking space determination unit that determines whether or not a width of an entrance portion of the corrected parking space candidate is equal to or larger than a first threshold value; and
   a vehicle guidance unit that guides the host vehicle to the corrected position of the parking space candidate when it is determined that the width is equal to or larger than the first threshold value,
   wherein, in a case where the adjacent obstacles are present at both sides of the parking space candidate and when processing by the image selection unit, processing by the stereo image processing unit, processing by the position determination unit, and processing by the parking space correction unit are completely performed on the adjacent obstacles, the parking space determination unit determines whether or not the width of the corrected entrance portion of the parking space candidate is equal to or larger than the first threshold value,
   wherein, when it is determined that the width is equal to or larger than the first threshold value, the vehicle guidance unit guides the host vehicle to the corrected position of the parking space candidate;
   wherein, in a case where the adjacent obstacles are present at both sides of the parking space candidate, and when the processing by the stereo image processing unit and the processing by the position determination unit are not performed on the adjacent obstacles on one side because the selection of two or more captured images is not completely performed by the image selection unit, the parking space correction unit corrects the position of the parking space candidate based on a position of the adjacent obstacle in the side other than the side where the position on the parking space candidate side is determined,
   wherein the parking space determination unit determines whether or not the width of the entrance portion of the corrected parking space candidate is equal to or larger than a second threshold value which is larger than the first threshold value, wherein, when it is determined that the width is equal to or larger than the second threshold value, the vehicle guidance unit starts the operation of guiding the host vehicle to the corrected position of the parking space candidate, wherein, after starting the operation, when the image selection unit acquires two or more captured images in which the inner side surface of the obstacle adjacent at one side is captured, the processing by the stereo image processing unit, the processing by the position determination unit, and the processing by the parking space correction unit are performed on the adjacent obstacle at one side, and the positions of the parking space candidates are updated, and wherein the vehicle guidance unit guides the host vehicle to the updated position of the parking space candidate.

2. The parking assistance device according to claim 1, wherein the stereo image processing unit extracts the image of the obstacle and the vicinity of the obstacle for each of the selected two or more captured images, performs the stereo image processing on the extracted image, and calculates a three-dimensional point group of the obstacle.

3. The parking assistance device according to claim 1, wherein, in a case where the width of the entrance portion of the parking space candidate is equal to or larger than the first predetermined value, the image selection unit selects two captured images of which the area of the inner side surface is largest and second largest from the captured images in which the inner side surface of the adjacent obstacle is captured among the images in which the surroundings of the host vehicle are imaged, and wherein, in a case where the width of the entrance portion of the parking space candidate is smaller than the first predetermined value, the image selection unit selects all the captured images of which the area of the inner side surface is equal to or larger than the second predetermined value from the captured images in which the inner side surface of the adjacent obstacle is captured among the images in which the surroundings of the host vehicle are imaged.

4. A parking assistance device that performs a parking assistance, comprising:

a parking space candidate detection unit that estimates a position of each of obstacles based on data of distance to the obstacles at both sides of a host vehicle when the host vehicle on which the parking assistance device is mounted is traveling, and detects a parking space candidate at the sides of the host vehicle;

an image selection unit that selects two or more captured images in which an inner side surface of an adjacent obstacle adjacent to the parking space candidate on the side of the parking space candidate is captured among images captured by an imaging unit provided on the host vehicle, in which the surroundings of the host vehicle are imaged, when the parking space candidate is detected;

a stereo image processing unit that performs stereo image processing on the selected two or more captured images and calculates a three-dimensional point group of the obstacle;

a position determination unit that determines a position of the obstacle on the parking space candidate side based on the calculated three-dimensional point group;

a parking space correction unit that corrects a position of the parking space candidate based on the determined position of the obstacle on the parking space candidate side;

wherein, in a case where the width of the entrance portion of the parking space candidate is equal to or larger than the first predetermined value, the image selection unit selects two captured images of which the area of the inner side surface is largest and second largest from the captured images in which the inner side surface of the adjacent obstacle is captured among the images in which the surroundings of the host vehicle are imaged, and wherein, in a case where the width of the entrance portion of the parking space candidate is smaller than the first predetermined value, the image selection unit selects all the captured images of which the area of the inner side surface is equal to or larger than the second predetermined value from the captured images in which the inner side surface of the adjacent obstacle is captured among the images in which the surroundings of the host vehicle are imaged.

5. The parking assistance device according to claim 4, further comprising:

a parking space determination unit that determines whether or not a width of an entrance portion of the corrected parking space candidate is equal to or larger than a first threshold value; and a vehicle guidance unit that guides the host vehicle to the corrected position of the parking space candidate when it is determined that the width is equal to or larger than the first threshold value, wherein, in a case where the adjacent obstacles are present at both sides of the parking space candidate and when processing by the image selection unit, processing by the stereo image processing unit, processing by the position determination unit, and processing by the parking space correction unit are completely performed on the adjacent obstacles, the parking space determination unit determines whether or not the width of the corrected entrance portion of the parking space candidate is equal to or larger than the first threshold value, and wherein, when it is determined that the width is equal to or larger than the first threshold value, the vehicle guidance unit guides the host vehicle to the corrected position of the parking space candidate.

6. The parking assistance device according to claim 4, wherein, in a case where the adjacent obstacles are present at both sides of the parking space candidate, and when the processing by the stereo image processing unit and the processing by the position determination unit are not performed on the adjacent obstacles on one side because the selection of two or more captured images is not completely performed by the image selection unit, the parking space correction unit corrects the position of the parking space candidate based on a position of the adjacent obstacle in the side other than the side where the position on the parking space candidate side is determined, wherein the parking space determination unit determines whether or not the width of the entrance portion of the corrected parking space candidate is equal to or larger than a second threshold value which is larger than the first threshold value, wherein, when it is determined that the width is equal to or larger than the second threshold value, the vehicle guidance unit starts the operation of guiding the host vehicle to the corrected position of the parking space candidate, wherein, after starting the operation, when the image selection unit acquires two or more captured images in which the inner side surface of the obstacle adjacent at one side is captured, the processing by the stereo image processing unit, the processing by the position determination unit, and the processing by the parking space correction unit are performed on the adjacent obstacle at one side, and the positions of the parking space candidates are updated, and wherein the vehicle guidance unit guides the host vehicle to the updated position of the parking space candidate.

7. The parking assistance device according to claim 4, wherein the stereo image processing unit extracts the image of the obstacle and the vicinity of the obstacle for each of the selected two or more captured images, performs the stereo image processing on the extracted image, and calculates a three-dimensional point group of the obstacle.

\* \* \* \* \*